US012117763B2

(12) United States Patent
Nosho et al.

(10) Patent No.: US 12,117,763 B2
(45) Date of Patent: Oct. 15, 2024

(54) DEVELOPMENT DEVICE, PROCESS CARTRIDGE, AND IMAGE FORMING APPARATUS

(71) Applicant: CANON KABUSHIKI KAISHA, Tokyo (JP)

(72) Inventors: Hiroaki Nosho, Suntou-gun (JP); Toru Oguma, Mishima (JP); Tetsuya Numata, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/331,076

(22) Filed: Jun. 7, 2023

(65) Prior Publication Data

US 2023/0315002 A1 Oct. 5, 2023

Related U.S. Application Data

(63) Continuation of application No. 17/681,515, filed on Feb. 25, 2022, now Pat. No. 11,703,795, which is a continuation of application No. 16/795,308, filed on Feb. 19, 2020, now Pat. No. 11,287,772, which is a continuation of application No. 16/280,800, filed on Feb. 20, 2019, now Pat. No. 10,606,210, which is a continuation of application No. 15/812,977, filed on Nov. 14, 2017, now Pat. No. 10,254,710.

(30) Foreign Application Priority Data

Nov. 18, 2016 (JP) ................................ 2016-225275
Aug. 25, 2017 (JP) ................................ 2017-162243

(51) Int. Cl.
*G03G 21/16* (2006.01)
*G03G 15/08* (2006.01)
*G03G 21/18* (2006.01)

(52) U.S. Cl.
CPC ....... *G03G 21/1652* (2013.01); *G03G 15/086* (2013.01); *G03G 21/1676* (2013.01); *G03G 21/1821* (2013.01); *G03G 21/1871* (2013.01)

(58) Field of Classification Search
CPC .................................................... G03G 15/086
See application file for complete search history.

(56) References Cited

U.S. PATENT DOCUMENTS

2008/0159774 A1* 7/2008 Tanabe ............... G03G 21/1842 399/90
2008/0212993 A1* 9/2008 Ishii .................. G03G 21/1652 399/111
2016/0252874 A1* 9/2016 Fujiwara ............ G03G 21/1676 399/27

* cited by examiner

*Primary Examiner* — Gregory H Curran
(74) *Attorney, Agent, or Firm* — Canon U.S.A., Inc. IP Division

(57) ABSTRACT

There are demands for stable connections of contact points between a process cartridge, including a development device, and an image forming device. A development contact point, a first contact point, and a second contact point are disposed in this order on the inside in a perpendicular direction with respect to an insertion direction in which a development device is inserted into an image forming apparatus.

14 Claims, 19 Drawing Sheets

DEVELOPMENT DEVICE, PROCESS CARTRIDGE, AND IMAGE FORMING APPARATUS

CROSS REFERENCE TO RELATED APPLICATIONS

The present application is a continuation of U.S. patent application Ser. No. 17/681,515, filed on Feb. 25, 2022, which is a continuation of U.S. patent application Ser. No. 16/795,308, filed on Feb. 19, 2020, and issued on Mar. 29, 2022 as U.S. Pat. No. 11,287,772, which is a continuation of U.S. patent application Ser. No. 16/280,800, filed on Feb. 20, 2019 and issued on Mar. 31, 2020 as U.S. Pat. No. 10,606,210, which is a continuation of U.S. patent application Ser. No. 15/812,977, filed on Nov. 14, 2017 and issue on Apr. 9, 2019 as U.S. Pat. No. 10,254,710, which claims priority from Japanese Patent Application No. 2016-225275, filed Nov. 18, 2016, and Japanese Patent Application No. 2017-162243, filed Aug. 25, 2017, all of which are hereby incorporated by reference herein in their entireties.

BACKGROUND OF THE INVENTION

Field of the Invention

The present invention relates to a development device, a process cartridge, and an image forming apparatus.

In the description, the term "image forming apparatus" refers to an apparatus which forms images on recording materials. The term "process cartridge" refers to a process cartridge including at least an image carrying member. In many cases, a process cartridge is a cartridge in which a charging unit, a development unit, a cleaning unit, and an image carrying member are integrated and which is attachable to (or insertable into) and removable from the main body of an image forming apparatus. Further, the term "development device" refers to a development device including at least a developer carrying member. In many cases, a development device is a development device in which a developer carrying member and a development frame for supporting the developer carrying member are integrated and which is attachable to (or insertable into) and removable from the main body of an image forming apparatus.

Examples of an electrophotographic image forming apparatus include copying machines, light-emitting diode (LED) printers, laser printers, and facsimile apparatuses.

Description of the Related Art

In an electrophotographic image forming apparatus (hereinafter, referred to simply as "image forming apparatus"), an electrophotographic photosensitive member, i.e., photosensitive drum, which is an image carrying member and is in general in the shape of a drum, is uniformly charged. Next, the charged photosensitive drum is selectively exposed to form an electrostatic latent image (electrostatic image) on the photosensitive drum. Next, the electrostatic latent image formed on the photosensitive drum is developed with a toner, which is developer, to form a toner image. Then, the toner image formed on the photosensitive drum is transferred onto a recording material such as a recording sheet or plastic sheet, and the toner image transferred on the recording material is heated and pressed so that the toner image is fixed to the recording material. In this way, an image is recorded.

In general, such an image forming apparatus requires resupply of toner and maintenance of various processing units. To facilitate the toner resupply and maintenance, a process cartridge in which a photosensitive drum, a charging unit, a development unit, a cleaning unit, etc. are integrated in a frame member and which is attachable to and removable from the main body of an image forming apparatus has been put into practical use.

This process cartridge method enables users to conduct maintenance of an apparatus on their own, so operability is improved significantly, and an image forming apparatus with excellent usability is provided. For this reason, the process cartridge method is widely used in image forming apparatuses.

In such a process cartridge, in some cases, the amount of toner needs to be detected. Japanese Patent Application Laid-Open No. 2015-34984 discusses a configuration of detecting an amount of remaining toner using a developer carrying member and a conductive member.

In a case of a cartridge capable of storing a large amount of toner which is developer, it is sometimes desirable to modify the configuration discussed in Japanese Patent Application Laid-Open No. 2015-34984 to use two or more conductive members besides the developer carrying member. This enables accurate detection of states in which the amount of developer in the cartridge is large and states in which the amount of developer in the cartridge is so small that the cartridge needs to be replaced.

However, in a case in which a plurality of contact points of the developer carrying member and the conductive members needs to be provided so as to ensure electrical connections from an image forming apparatus, the contact points of the developer carrying member and the conductive members may come into contact with a contact point of the image forming apparatus that is not supposed to be connected, depending on the arrangement of the contact points. Thus, there are demands for stable connections of contact points.

SUMMARY OF THE INVENTION

According to an aspect of the present invention, a development device which is insertable into an image forming apparatus includes a housing configured to store developer, a developer carrying member configured to carry developer, a first conductive member having a first surface for use in detection of an amount of developer stored in the housing based on a change in electrostatic capacitance, the first conductive member extending in a lengthwise direction of the developer carrying member, a second conductive member having a second surface facing the first surface, the second conductive member extending in the lengthwise direction of the developer carrying member, a development contact point to be electrically connected to the developer carrying member, a first contact point to be electrically connected to the first conductive member, and a second contact point to be electrically connected to the second conductive member, wherein the first contact point is disposed on a more inner side than the development contact point in a perpendicular direction with respect to an insertion direction in which the development device is inserted into the image forming apparatus, and wherein the second contact point is disposed on a more inner side than the first contact point in the perpendicular direction with respect to the insertion direction in which the development device is inserted into the image forming apparatus.

According to another aspect of the present invention, a process cartridge and an image forming apparatus are provided.

Further features of the present invention will become apparent from the following description of exemplary embodiments with reference to the attached drawings.

DESCRIPTION OF THE EMBODIMENTS

Various exemplary embodiments of the invention will be described in detail below with reference to the drawings. It should be noted, however, that sizes, materials, shapes, relative locations, etc. of components described in the exemplary embodiments are to be changed as appropriate according to the structure of an apparatus to which an exemplary embodiment of the present invention is applied and various conditions. In other words, the exemplary embodiments described below are not intended to limit the scope of the invention. Further, each of the embodiments of the present invention described below can be implemented solely or as a combination of a plurality of the embodiments or features thereof where necessary or where the combination of elements or features from individual embodiments in a single embodiment is beneficial.

In the present description, the direction of a rotation axis line of an electrophotographic photosensitive drum which is an image carrying member is defined as a lengthwise direction.

The direction of a rotation axis line of a developer carrying member is parallel to the direction of the rotation axis line of the image carrying member, so the direction of the rotation axis line of a development roller (or development sleeve) which is the developer carrying member is also defined as the lengthwise direction.

Further, in the lengthwise direction, the side of the electrophotographic photosensitive drum that receives a driving force from the main body of an image forming apparatus is defined as a driving side, and the side opposite to the driving side is defined as a non-driving side.

An entire structure of an image forming apparatus and an image forming process are described with reference to FIGS. 2 and 3.

Figure 2:
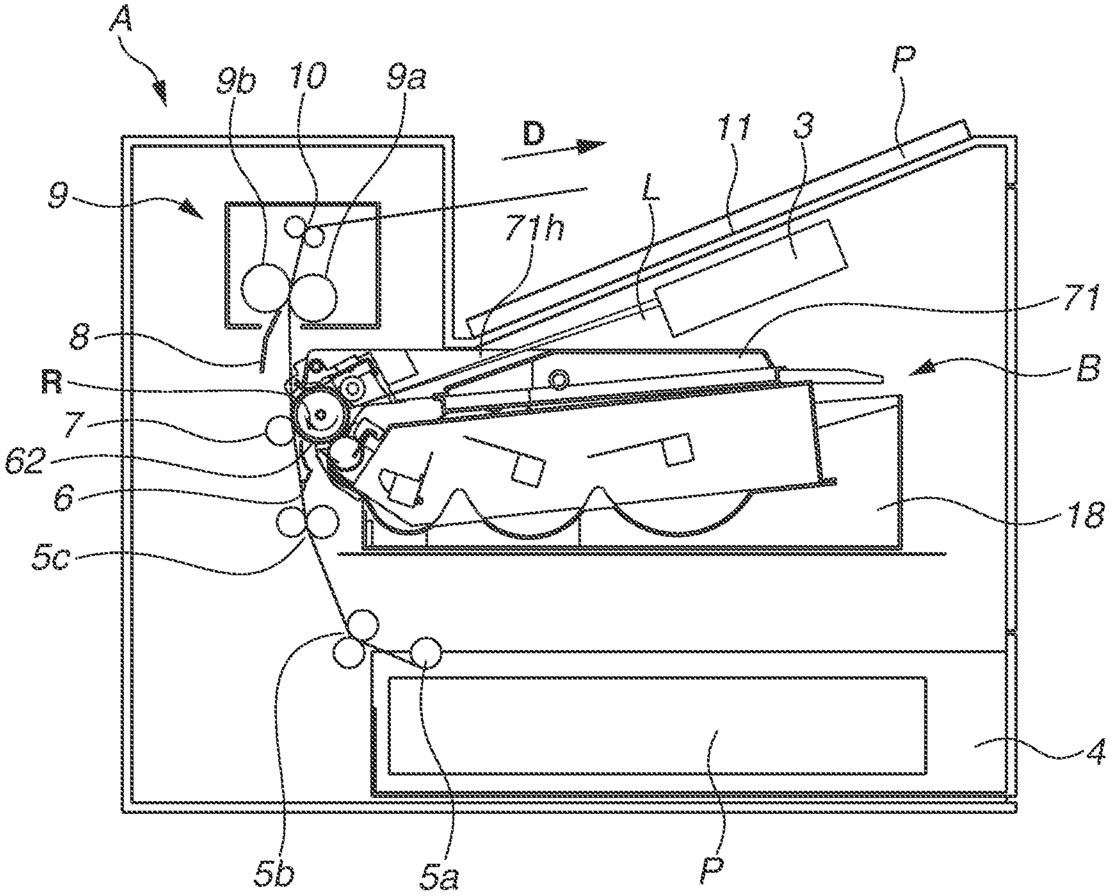
FIG. 2 is a cross sectional view illustrating a main body of an image forming apparatus and the process cartridge according to the first exemplary embodiment.

FIG. 2 is a cross sectional view illustrating the main body (hereinafter, referred to as "apparatus body A") of an electrophotographic image forming apparatus (hereinafter, referred to as "image forming apparatus") and a process cartridge (hereinafter, referred to as "cartridge B") according to a first exemplary embodiment of the present invention.

Figure 3:
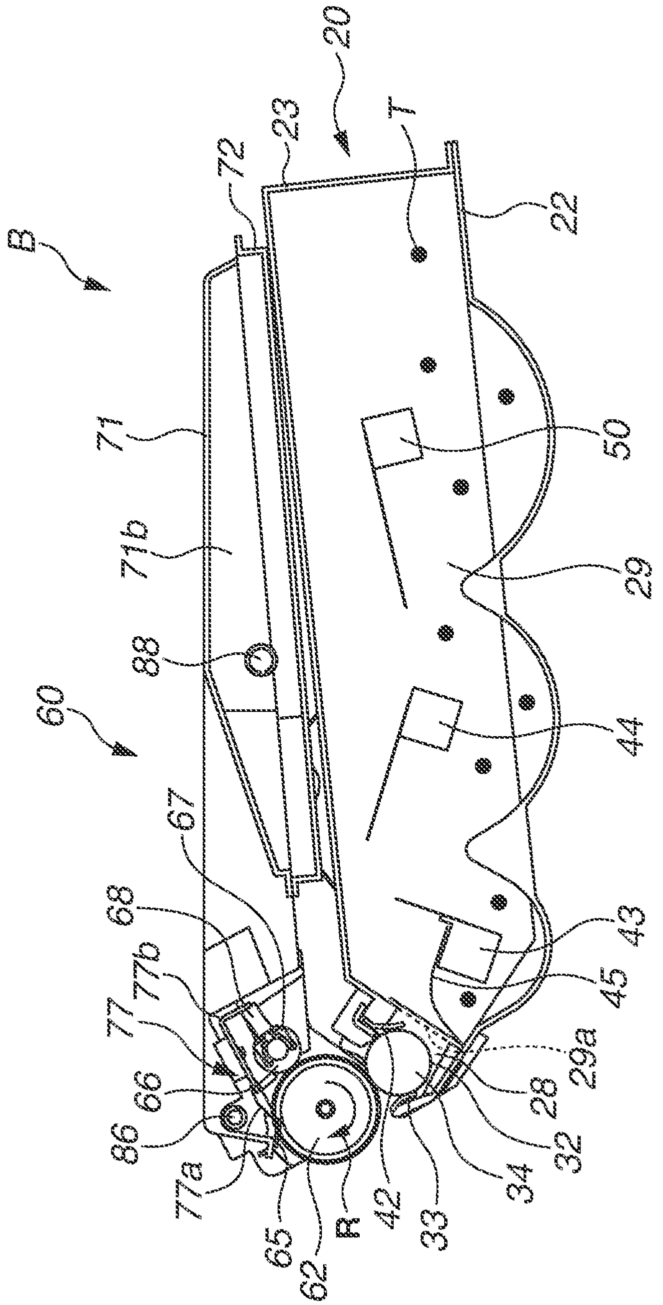
FIG. 3 is a cross sectional view illustrating the process cartridge according to the first exemplary embodiment.

FIG. 3 is a cross sectional view illustrating the cartridge B.

The apparatus body A corresponds to the electrophotographic image forming apparatus that does not include the cartridge B. While the cartridge B according to the present exemplary embodiment is a process cartridge, the cartridge B can be a development device. In a case in which the development device is independently attachable to (or insertable into) and removable from the apparatus body, the apparatus body A corresponds to the image forming apparatus that does not include the development device.

<Entire Structure of Image Forming Apparatus>

The image forming apparatus illustrated in FIG. 2 is an electrophotographic laser beam printer in which the cartridge B is attachable to (or insertable into) and removable from the apparatus body A. When the cartridge B is attached to the apparatus body A, an exposure device 3 (laser scanner unit) for forming a latent image on an electrophotographic photosensitive drum 62 of the cartridge B is disposed. Further, a sheet tray 4 is disposed below the cartridge B. The sheet tray 4 stores recording materials (hereinafter, referred to as "sheet material P") on which images are to be formed.

Further, the apparatus body A includes a pickup roller 5*a*, a pair of sheet feeding rollers 5*b*, a pair of sheet conveying rollers 5*c*, a transfer guide 6, a transfer roller 7, a conveyance guide 8, a fixing device 9, a pair of sheet discharge rollers 10, a sheet discharge tray 11, etc. disposed sequentially along a conveyance direction D in which the sheet material P is conveyed. The fixing device 9 includes a heating roller 9*a* and a pressing roller 9*b*.

<Image Forming Process>

Next, an outline of the image forming process will be described below. Based on a print start signal, the electrophotographic photosensitive drum 62 (hereinafter, referred to as "drum 62") is driven and rotated at a predetermined circumferential velocity (processing speed) in the direction of an arrow R.

A charging roller 66 which is a charging member and to which a bias voltage is applied is brought into contact with the outer peripheral surface of the drum 62 to uniformly and evenly charge the outer peripheral surface of the drum 62.

The exposure device 3 outputs laser light L corresponding to image information. The laser light L passes through a laser opening 71*h* in a cleaning housing 71 of the cartridge B and scans and exposes the outer peripheral surface of the drum 62. In this way, an electrostatic latent image corresponding to the image information is formed on the outer peripheral surface of the drum 62.

Further, a first conveyance member 43, a second conveyance member 44, and a third conveyance member 50 are rotated to agitate toner T in a toner chamber 29 and convey the toner T to a toner supply chamber 28 in a development unit 20 which is the development device, as illustrated in FIG. 3. The first conveyance member 43, the second conveyance member 44, and the third conveyance member 50 include a shaft portion and a sheet-shaped conveyance portion, and the sheet-shaped conveyance portion is attached to the shaft portion. As the shaft portion is rotated, the sheet-shaped conveyance portion is also rotated, and the toner T is pushed by the sheet and conveyed. The shaft portion of the closest one of the first conveyance member 43, the second conveyance member 44, and the third conveyance member 50 to the development roller is located immediately above a position between first and second electrode plates when viewed from the lengthwise direction of the development roller.

The first conveyance member 43, the second conveyance member 44, and the third conveyance member 50 are disposed in order from the developer carrying member side. The toner chamber 29 and the toner supply chamber 28 include a housing. According to the present exemplary embodiment, two housings, namely, first and second housings, are welded to form the toner chamber 29 and the toner supply chamber 28.

The toner T which is developer is borne on the surface of a development roller 32, which is the developer carrying member, by a magnetic force of a magnet roller 34 (stationary magnet).

While the toner T is triboelectrically charged, the layer thickness of the toner T on the peripheral surface of the development roller 32 is regulated by a development blade 42 which is a developer layer regulation member.

The toner T is transferred onto the drum 62 according to the electrostatic image or electrostatic latent image and visualized as a toner image which is a developer image.

Further, as illustrated in FIG. 2, the sheet material P stored in a lower portion of the apparatus body A is conveyed from the sheet tray 4 by the pickup roller 5*a*, the pair of sheet feeding rollers 5*b*, and the pair of sheet conveying rollers 5*c* in synchronization with the timing of output of the laser light L. Then, the sheet material P is conveyed through the transfer guide 6 to a transfer position between the drum 62 and the transfer roller 7. At the transfer position, the toner image is sequentially transferred from the drum 62 onto the sheet material P.

The sheet material P with the transferred toner image is separated from the drum 62 and conveyed along the conveyance guide 8 to the fixing device 9. Then, the sheet material P is passed through a nip portion formed by the heating roller 9*a* and the pressing roller 9*b* of the fixing device 9. At the nip portion, fixing processing by pressing and heating is conducted to fix the toner image to the sheet material P. The sheet material P to which the toner image has been fixed is conveyed to the pair of sheet discharge rollers 10 and discharged onto the sheet discharge tray 11.

Further, as illustrated in FIG. 3, after the toner image is transferred from the drum 62, residual toner on the outer peripheral surface of the drum 62 is removed by a cleaning blade 77 which is a cleaning member so that the drum 62 is available again for use in the image forming process. The toner removed from the drum 62 is stored in a waste toner chamber 71*b* of a cleaning unit 60.

According to the present exemplary embodiment, the charging roller 66, the development roller 32, the transfer roller 7, and the cleaning blade 77 are processing units that act on the drum 62.

<Cartridge Attachment and Removal>

Next, the attachment and removal of the cartridge B to and from the apparatus body A will be described below with reference to FIGS. 4A to 4C.

Figure 4A:
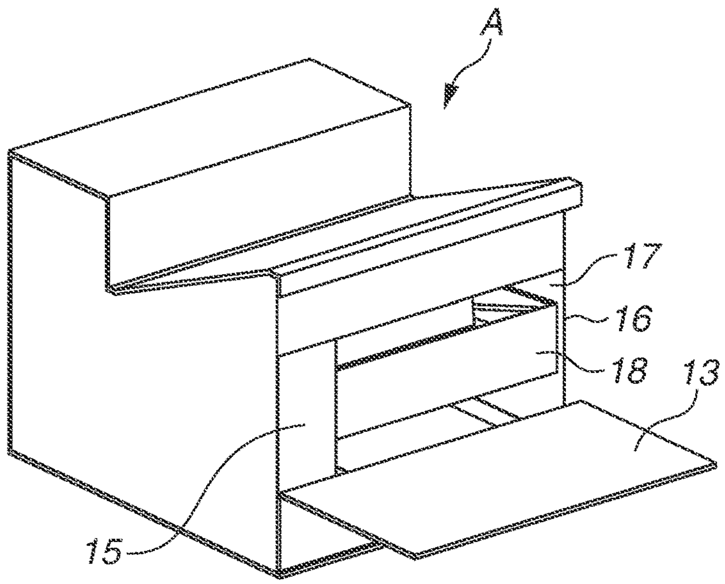
FIGS. 4A to 4C illustrate an operation of attaching/removing the process cartridge to/from the image forming apparatus.
Figure 4B:
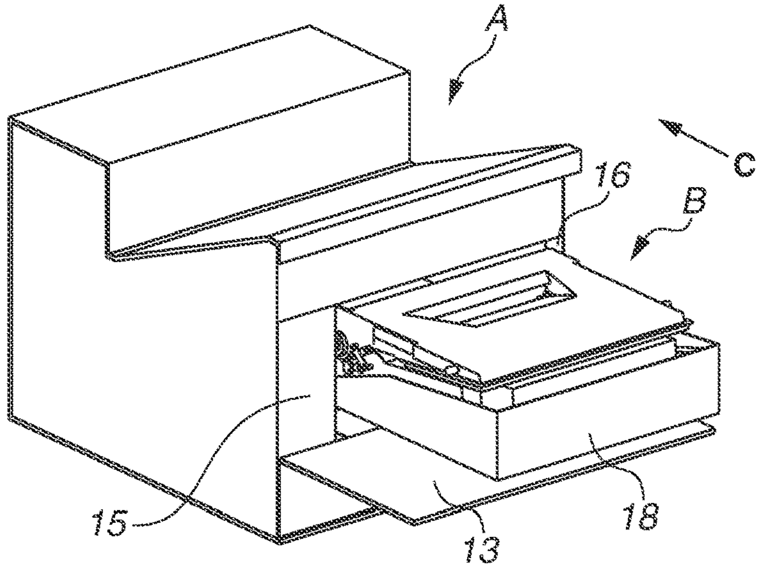
Figure 4C:
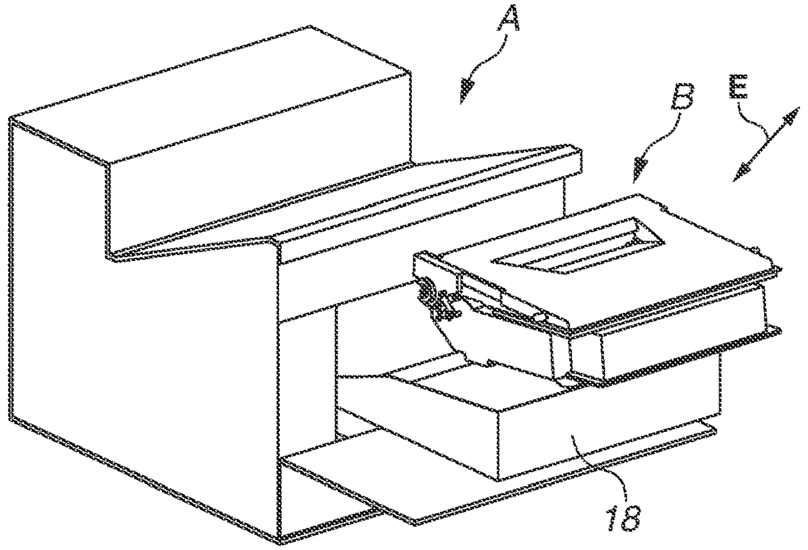

FIG. 4A is a perspective view illustrating the apparatus body A in the state in which a door 13 is opened to attach or remove the cartridge B. FIG. 4B is a perspective view illustrating the apparatus body A and the cartridge B in the state in which the door 13 is opened to attach or remove the cartridge B and a cartridge tray 18 which is a movable member or pullout member is pulled out. FIG. 4C is a perspective view illustrating the cartridge B removed while the door 13 is opened and the cartridge tray 18 which is the movable member is pulled out.

The cartridge tray 18 which is the movable member is movable into the apparatus body A with the cartridge B placed on the cartridge tray 18.

The door 13 is rotatably attached to the apparatus body A, and when the door 13 is opened, there is a cartridge insertion opening 17. The cartridge tray 18 is disposed in the cartridge insertion opening 17. The cartridge tray 18 is the movable member for attaching the cartridge B to the apparatus body A. When the cartridge tray 18 is pulled out to a predetermined position, the cartridge B is attachable to and removable from the cartridge tray 18 which is the movable member along an attachment/removal direction E. Then, the cartridge B placed on the cartridge tray 18 is attached to the inside of (or inserted into) the apparatus body A in the direction of an arrow C in FIG. 4B along a guide rail (not illustrated).

<Cartridge Support>

Next, the structure of the apparatus body A that supports the cartridge B will be described below with reference to FIGS. 1, 4A, 4B, 4C, 5A, and 5B.

Figure 5A:
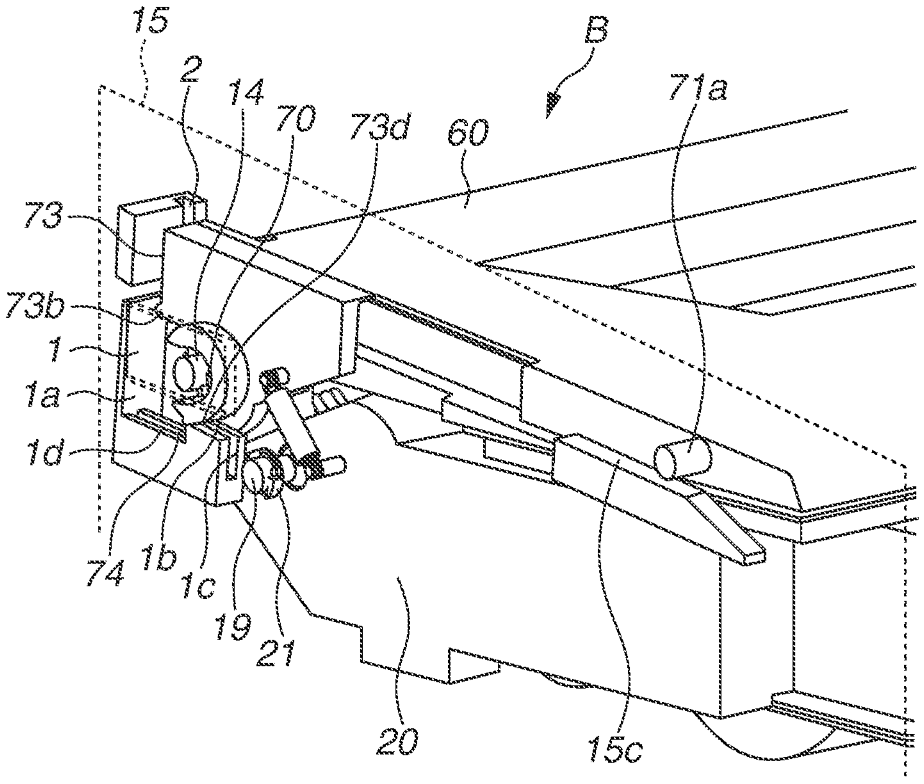
FIGS. 5A and 5B are perspective views illustrating a driving-side positioning portion and a non-driving-side positioning portion of the main body of the image forming apparatus.
Figure 5B:
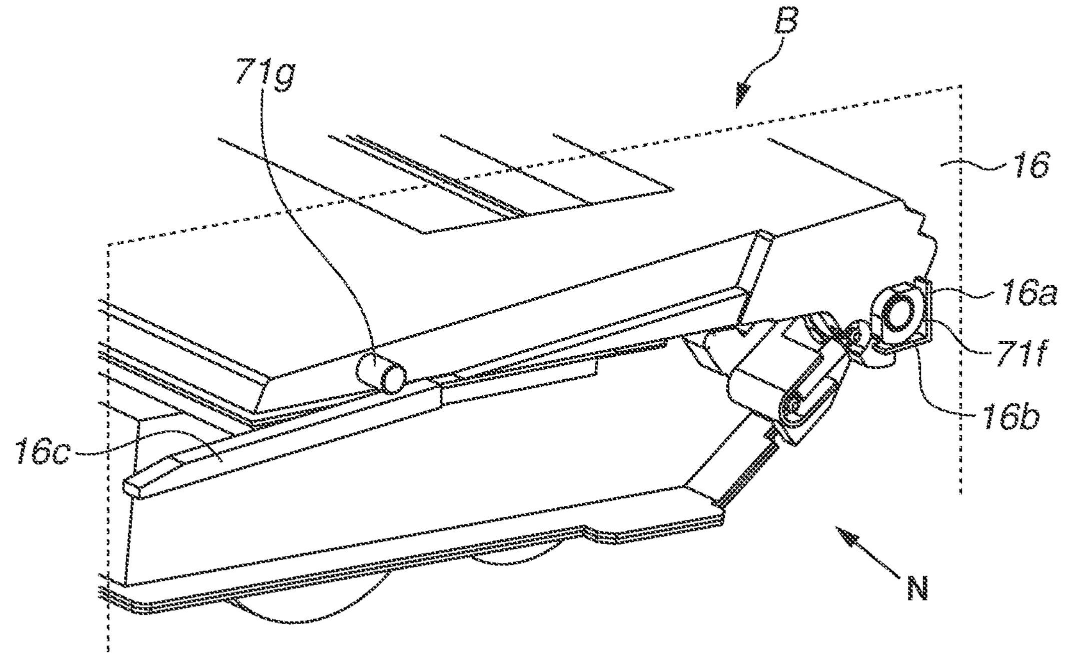

As illustrated in FIG. 4A, the apparatus body A includes a driving-side plate 15 and a non-driving-side plate 16 for supporting the cartridge B. Further, as illustrated in FIG. 5A, the driving-side plate 15 includes a first driving-side support portion, a second driving-side support portion, and a rotation support portion 15*c* for supporting the rotation of the cartridge B. The non-driving-side plate 16 includes a first non-driving-side support portion 16*a*, a second non-driving-side support portion 16*b*, and a rotation support portion 16*c*.

Further, supported portions 73*b* and 73*d* of a drum bearing 73 and a driving-side boss 71*a*, a non-driving-side projecting portion 71*f*, and a non-driving-side boss 71*g* of the cleaning housing 71 are provided as supported portions of the cartridge B. Further, the supported portion 73*b* is supported by a first driving-side support portion 1*a*, and the supported portion 73*d* is supported by a second driving-side support portion 1*b*, and the driving-side boss 71*a* is supported by the rotation support portion 15*c*. Further, the non-driving-side projecting portion 71*f* is supported by the first non-driving-side support portion 16*a* and the second non-driving-side support portion 16*b*, and the non-driving-side boss 71*g* is supported by the rotation support portion 16*c*.

Figure 1:
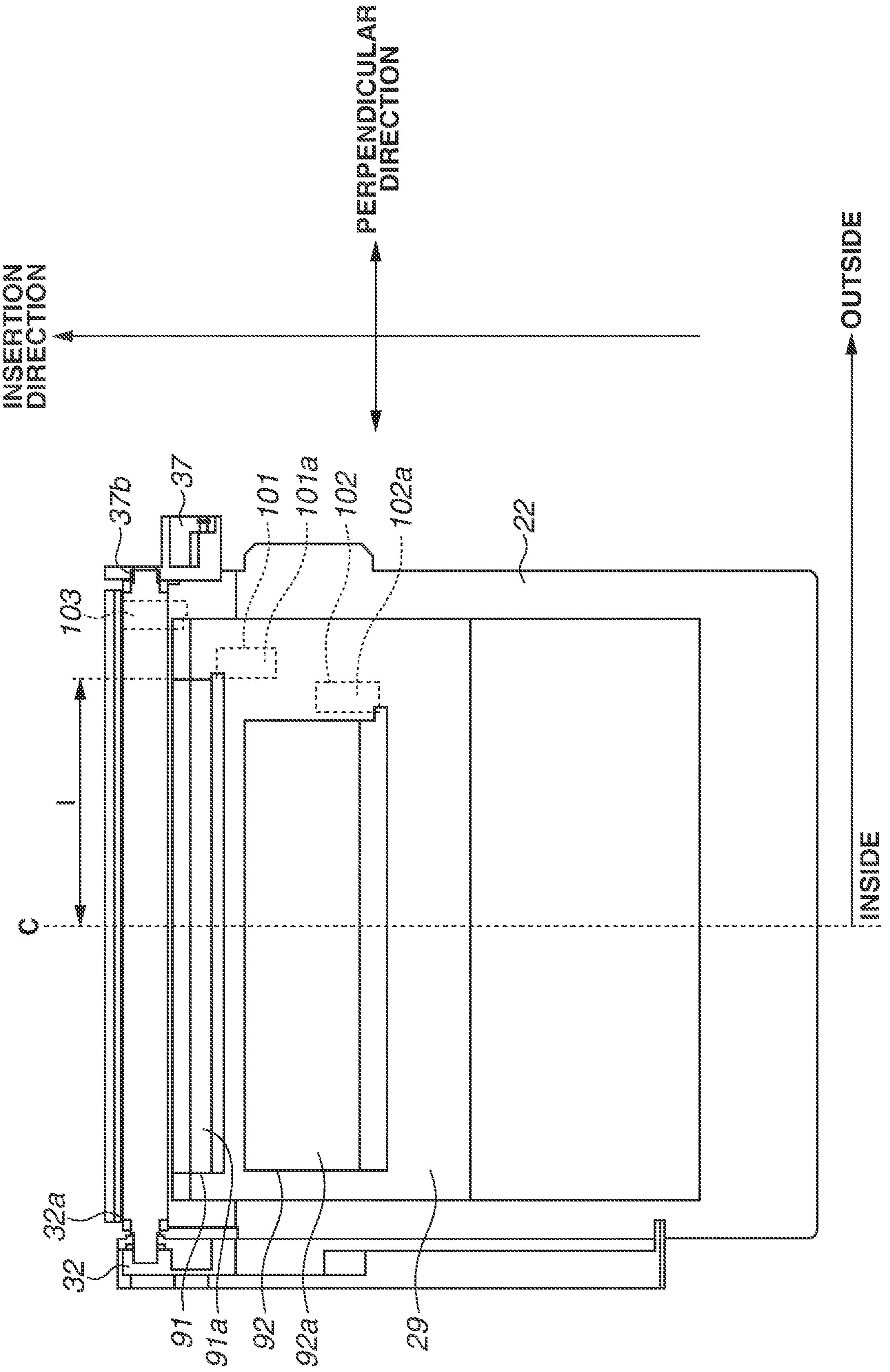
FIG. 1 is a cross sectional view illustrating a development unit of a process cartridge according to a first exemplary embodiment.

Further, as illustrated in FIGS. 1 and 5A, a regulated portion provided on the drum bearing 73 is fitted to a regulating portion 2 provided on the apparatus body A so that the position of the cartridge B in the direction of a drum axis line is determined to position the cartridge B in the apparatus body A.

<Entire Cartridge Structure>

Figure 7A:
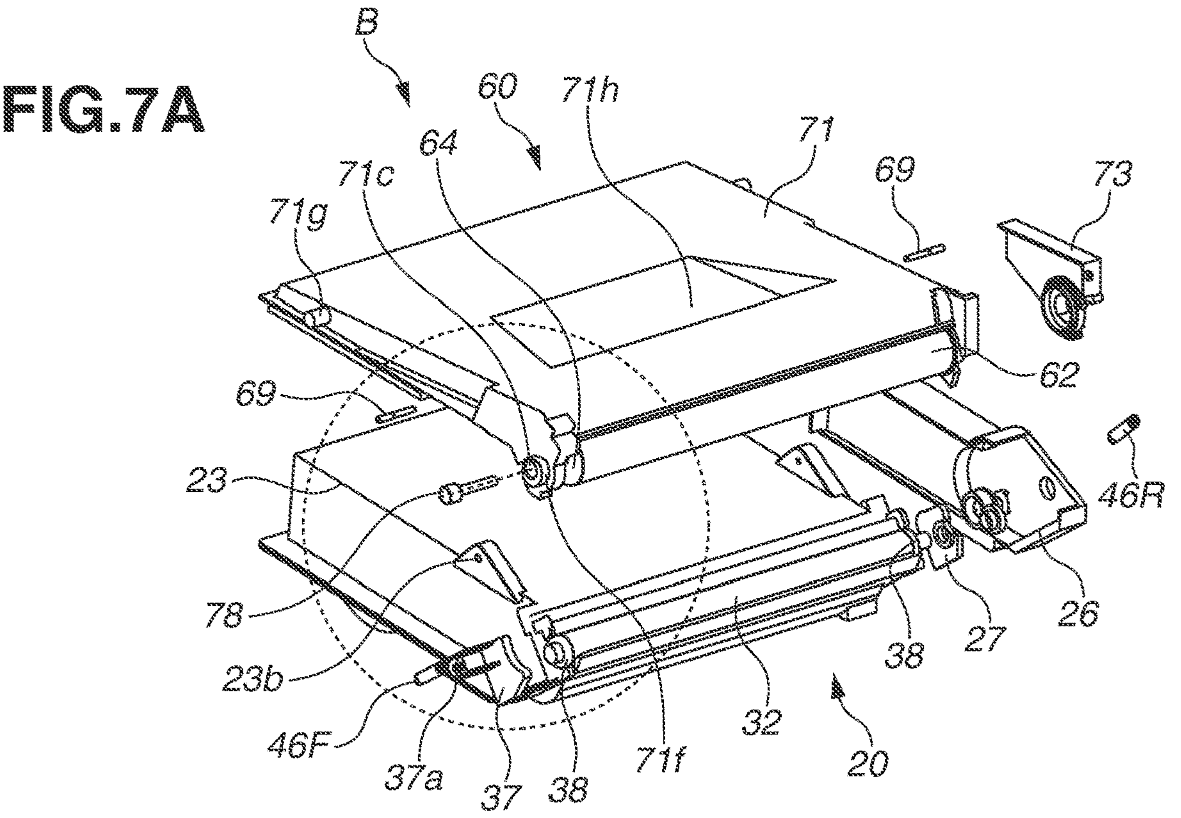
FIGS. 7A and 7B are exploded views illustrating the process cartridge according to the first exemplary embodiment.
Figure 7B:
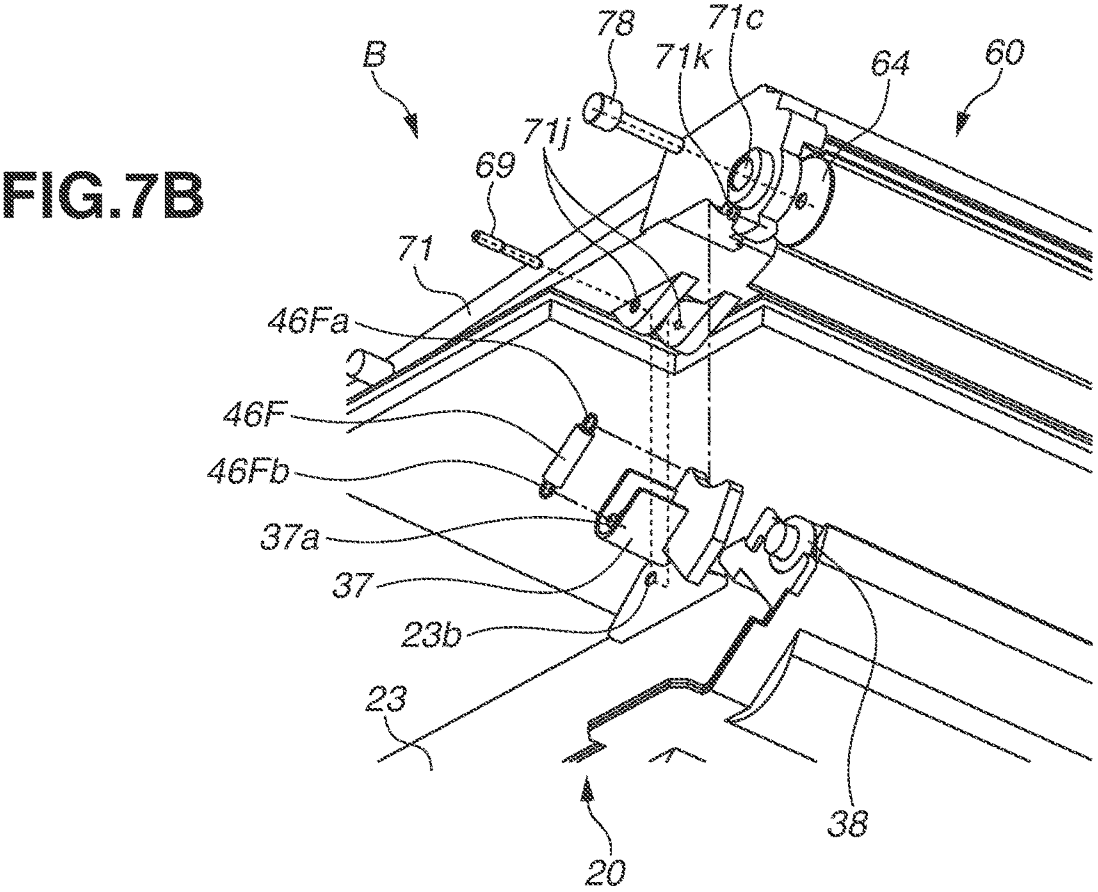
Figure 8A:
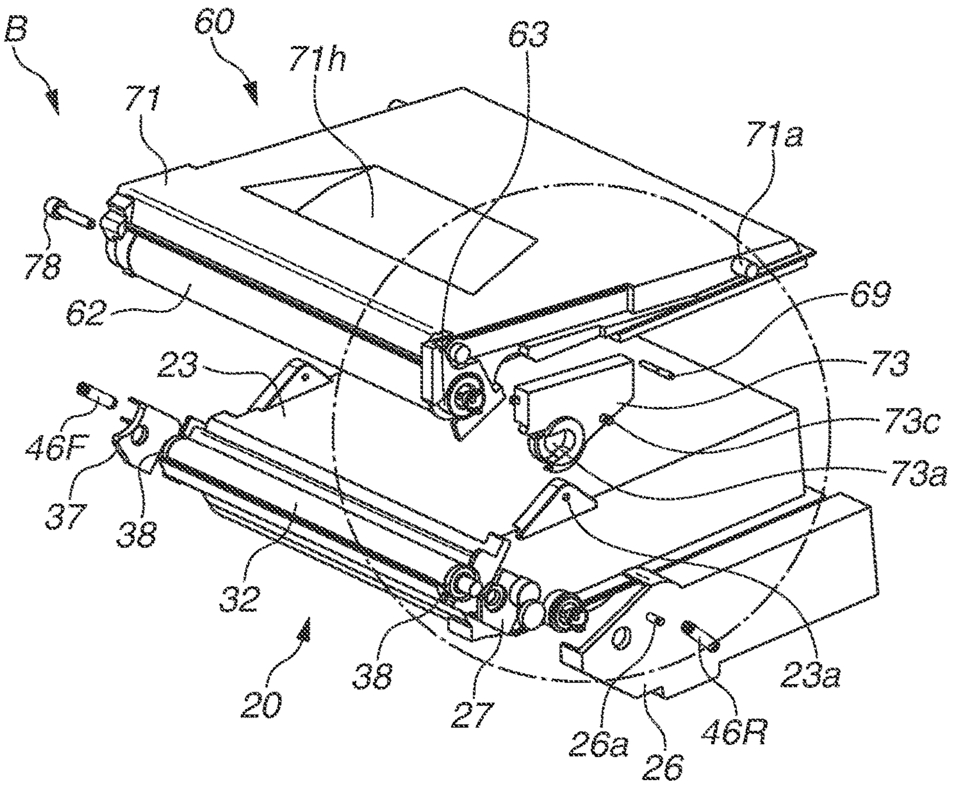
FIGS. 8A and 8B are exploded views illustrating the process cartridge according to the first exemplary embodiment.
Figure 8B:
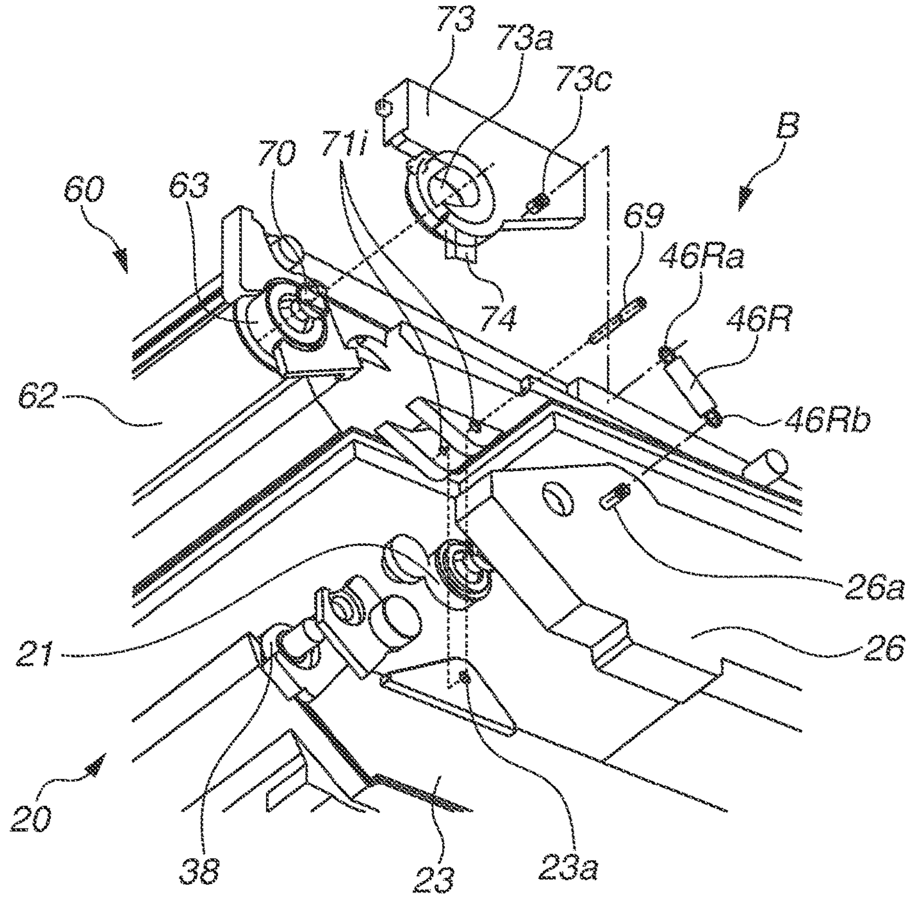

Next, the entire structure of the cartridge B will be described below with reference to FIGS. 3, 6A, 6B, 7A, 7B, 8A, and 8B. FIG. 3 is a cross sectional view illustrating the cartridge B. FIGS. 7A, 7B, 8A, and 8B are perspective views illustrating the structure of the cartridge B. FIGS. 7B and 8B are partially-enlarged views illustrating dotted-line regions in FIGS. 7A and 8A which are enlarged and viewed from a different angle. Description of screws used to join parts is omitted in the present exemplary embodiment.

As illustrated in FIG. 3, the cartridge B according to the present exemplary embodiment includes the cleaning unit 60 and the development unit 20. While the process cartridge in which the cleaning unit 60 and the development unit 20 are combined is attachable to (or insertable into) and removable from the image forming apparatus is described in the present exemplary embodiment, the structure is not limited to the above-described structure, and the cleaning unit 60 and the development unit 20 as independent units can separately be attachable to (or insertable into) and removable from the image forming apparatus. Further, while the cartridge B supported on the movable tray is moved to be inserted into the apparatus according to the present exemplary embodiment, the cartridge B can be inserted directly by a user.

As illustrated in FIG. 3, the cleaning unit 60 includes the drum 62, the charging roller 66, the cleaning member 77, the cleaning housing 71, and a cover member 72 fixed to the cleaning housing 71 by welding, etc. The cleaning housing 71 supports the drum 62, the charging roller 66, and the cleaning member 77. In the cleaning unit 60, the charging roller 66 and the cleaning member 77 are each disposed to be in contact with the outer peripheral surface of the drum 62.

The cleaning member 77 according to the present exemplary embodiment includes a rubber blade 77*a* and a support member 77*b* which supports the rubber blade 77*a*. The rubber blade 77*a* is a blade-shaped elastic member made of rubber which is an elastic material. The rubber blade 77*a* abuts on the drum 62 in the opposite direction to the direction in which the drum 62 is rotated. Specifically, the rubber blade 77*a* abuts on the drum 62 in such a way that a leading edge portion of the rubber blade 77*a* faces upstream in the direction in which the drum 62 is rotated. While the cleaning member is described with reference to the cleaning blade in the present exemplary embodiment, the cleaning member is not limited to the cleaning blade and can be a roller-shaped cleaning member, etc.

Figure 6A:
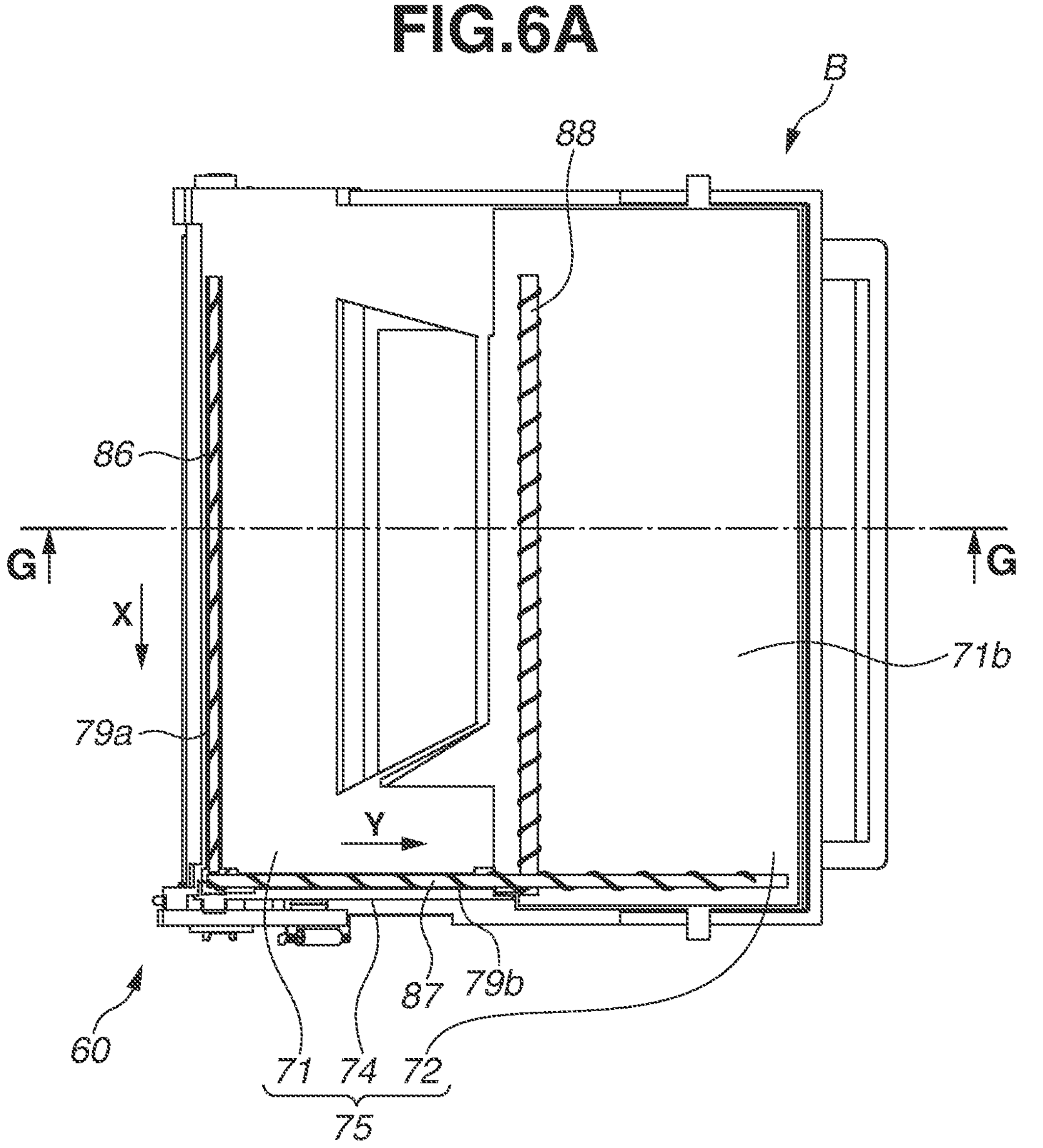
FIGS. 6A and 6B are cross sectional views illustrating the inside of a cleaning container of the process cartridge according to the first exemplary embodiment.
Figure 6B:
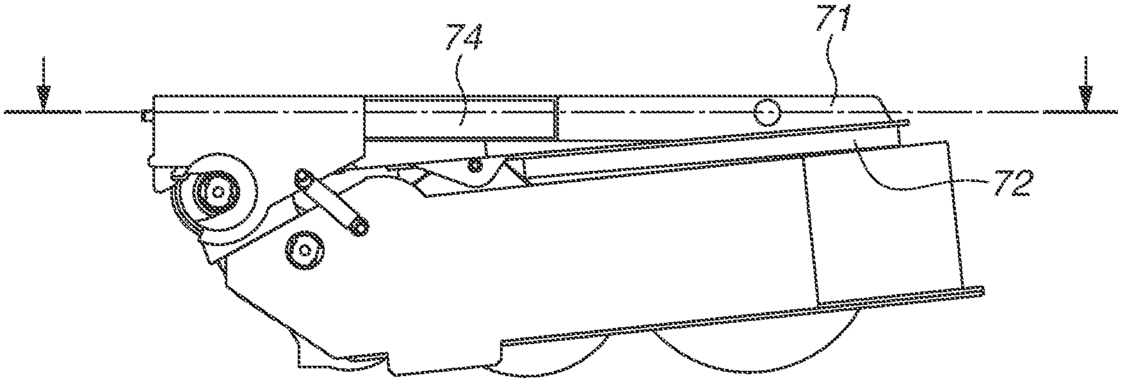

FIG. 6A is a cross sectional view illustrating the cleaning unit 60. As illustrated in FIG. 3, the waste developer (hereinafter, referred to as "waste toner") removed from the surface of the drum 62 by the cleaning member 77 is conveyed by a waste toner conveyance member 86. The waste toner conveyance member 86 includes at least a shaft and a conveyance portion which conveys the toner.

In the present exemplary embodiment, the case in which the waste toner conveyance member 86 is a screw will be described. As illustrated in FIG. 6, the cleaning unit 60 includes a first screw 86, a second screw 87, a third screw 88, the cleaning housing 71, a screw cover 74, and the cover member 72. A waste toner storage container 75 which is the developer storage container includes the cleaning housing 71, the screw cover 74, and the cover member 72 which are integrated, and the waste toner is stored in the waste toner storage container 75.

The toner is conveyed in the direction of an arrow X by the first screw 86 which is a first waste toner conveyance member. Then, the toner is conveyed in the direction of an arrow Y by the second screw 87 which is a second waste toner conveyance member. Thereafter, the toner is accumulated in the waste toner chamber 71*b* by the third screw 88 which is a third waste toner conveyance member provided in the waste toner chamber 71*b* formed by the cleaning housing 71 and the cover member 72. According to the present exemplary embodiment, the rotation axis lines of the first screw 86 and the third screw 88 are parallel to the rotation axis line of the drum 62, and the rotation axis line of the second screw 87 is orthogonal to the rotation axis line of the drum 62. The arrangement relationship is not limited to the above-described arrangement relationship and may be any arrangement relationship by which a driving force can be transmitted and the toner can be conveyed. For example, the axis lines of the first screw 86 and the second screw 87 may be arranged to intersect with each other, and the rotation axis line of the second screw 87 may be arranged to incline inward from an end portion of the cartridge B in the lengthwise direction. Further, the axis lines of the first screw 86 and the third screw 88 may be arranged not to be parallel but to intersect with each other.

The screws that are the waste toner conveyance members are provided with a developer conveyance portion configured to convey the toner. The developer conveyance portion may have any structure by which the waste toner is conveyable, and a spiral-shaped protruding portion or a plurality of portions in a twisted-blade shape may be used. Further, the waste toner conveyance members are not limited to the screws and may have any structure by which the waste toner is conveyable in the axial direction of the waste toner conveyance members. For example, the waste toner may be conveyed with a coil, etc.

Further, as illustrated in FIG. 3, a drum abutment sheet 65 for preventing a leakage of the waste toner from the cleaning housing 71 is provided on an edge portion of the cleaning housing 71 to abut on the drum 62. The drum 62 receives a driving force from a main body driving motor (not illustrated) which is a driving source so that the drum 62 is driven and rotated in the direction of an arrow R in FIG. 3 according to an image forming operation.

The charging roller 66 is rotatably attached to each end portion of the cleaning unit 60 in the lengthwise direction (substantially parallel to the direction of the rotation axis line of the drum 62) of the cleaning housing 71 via a charging roller bearing 67. The charging roller bearing 67 is pressed toward the drum 62 by a biasing member 68 to press the charging roller 66 against the drum 62. The charging roller 66 is driven and rotated by the rotation of the drum 62.

As illustrated in FIG. 3, the development unit 20 includes the development roller 32, a developer container 23, and the development blade 42. The developer container 23 supports the development roller 32. The development roller 32 is disposed in such a way that the central axis of the development roller 32 is in the same direction as the direction of the rotation axis line of the drum 62. The magnet roller 34 is provided in the development roller 32. Further, the development blade 42 for regulating a toner layer on the development roller 32 is disposed in the development unit 20. As illustrated in FIGS. 7A and 8A, a space holding member 38 is attached to each end portion of the development roller 32, and the space holding members 38 abut on the drum 62 to hold the development roller 32 with a small space between the development roller 32 and the drum 62. Further, as illustrated in FIG. 3, a development roller abutment sheet 33 for preventing a leakage of the toner from the development unit 20 is provided on an edge portion of a bottom member 22 to abut on the development roller 32. Further, the developer storage container includes a housing and the toner chamber 29 provided inside. The housing includes the developer container 23, which is a first housing, and the bottom member 22, which is a second housing. The toner chamber 29 is provided with the first conveyance member 43, the second conveyance member 44, and the third conveyance member 50. The first conveyance member 43, the second conveyance member 44, and the third conveyance member 50 agitate the toner T stored in the toner chamber 29 and conveys the toner T to the toner supply chamber 28.

An opening 29*a* (portion specified by a broken line) is formed between the toner chamber 29 and the toner supply chamber 28. The opening 29*a* is sealed with a sealing member 45 until the cartridge B is used. The sealing member 45 is a sheet-shaped member made of a material such as polyethylene. One end side of the sealing member 45 is welded to the developer container 23, which is the housing, around the opening 29*a*, and the other end side of the sealing member 45 is fixed to the first conveyance member 43. When the cartridge B is used for the first time, as the first conveyance member 43 is rotated, the portion of the sealing member 45 that is welded to the developer container 23 is removed and the sealing member 45 is wound around the first conveyance member 43 to open the opening 29*a*.

As illustrated in FIGS. 7A and 8A, the cleaning unit 60 and the development unit 20 are combined to form the cartridge B.

The cleaning unit 60 includes the cleaning housing 71, the cover member 72, the drum 62, the drum bearing 73, which rotatably supports the drum 62, and a drum shaft 78. As illustrated in FIG. 8B, on the driving-side, a driving-side drum flange 63 of the drum 62 that is provided on the driving-side is rotatably supported by a hole portion 73*a* of the drum bearing 73. Further, as illustrated in FIG. 7B, on the non-driving-side, the drum shaft 78 which is pressed into a hole portion 71*c* of the cleaning housing 71 rotatably supports a hole portion (not illustrated) of a non-driving-side drum flange 64.

As illustrated in FIGS. 3, 7A, and 8A, the development unit 20 includes the bottom member 22, which is the housing, the developer container 23, which is another housing, and a driving-side development side member 26, which is a part of the housings. Further, the development unit 20 includes the development blade 42, which is a developer layer thickness regulating member, and the development roller 32, which is the developer carrying member. Further, the development roller 32 is rotatably attached to the developer container 23 by a bearing member 27 provided on the driving-side and a bearing member 37 provided on the non-driving-side.

Further, as illustrated in FIGS. 7B and 8B, the cleaning unit 60 and the development unit 20 are rotatably combined by a combining pin 69 to form the cartridge B.

Specifically, a first development support hole 23*a* and a second development support hole 23*b* are formed in the developer container 23 at the respective end portions of the development unit 20 in the lengthwise direction. Further, a first hanging hole 71*i* and a second hanging hole 71*j* are formed in the cleaning housing 71 at the respective end portions of the cleaning unit 60 in the lengthwise direction. The combining pin 69 that is pressed into the first hanging hole 71*i* and the second hanging hole 71*j* is fitted into the first development support hole 23*a* and the second development support hole 23*b* to rotatably connect the cleaning unit 60 and the development unit 20.

Further, a first hole portion 46Ra of a driving-side biasing member 46R is put around a boss 73*c* of the drum bearing 73, and a second hole portion 46Rb is put around a boss 26*a* of the driving-side development side member 26.

Further, a first hole portion 46Fa of a non-driving-side biasing member 46F is put around a boss 71*k* of the cleaning housing 71, and a second hole portion 46Fb is put around a boss 37*a* of the bearing member 37.

According to the present exemplary embodiment, the driving-side biasing member 46R and the non-driving-side biasing member 46F are formed of an extension spring. The development unit 20 is biased toward the cleaning unit 60 by a biasing force of the extension springs to ensure that the development roller 32 is pressed against the drum 62. Further, the space holding members 38 provided on the respective end portions of the development roller 32 hold the development roller 32 with a predetermined space between the development roller 32 and the drum 62.

<Remaining Developer Amount Detection Unit>

Figure 9A:
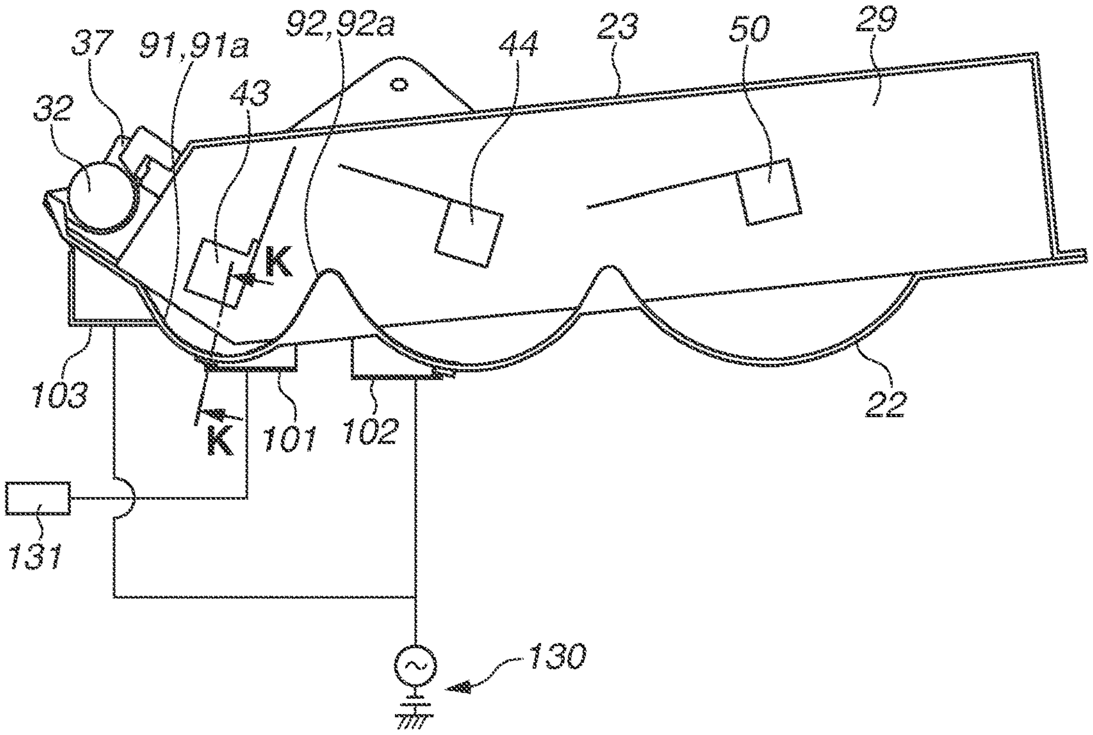
FIGS. 9A and 9B are cross sectional views illustrating the development unit of the process cartridge according to the first exemplary embodiment.
Figure 9B:
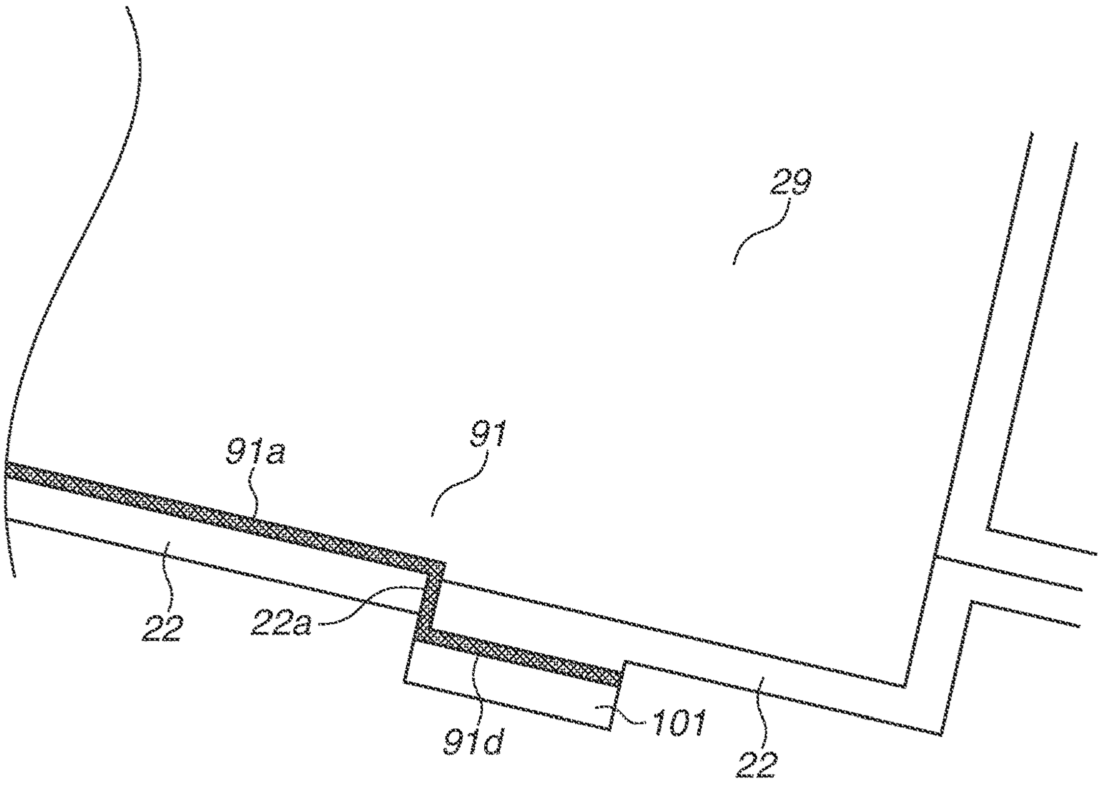
Figure 10A:
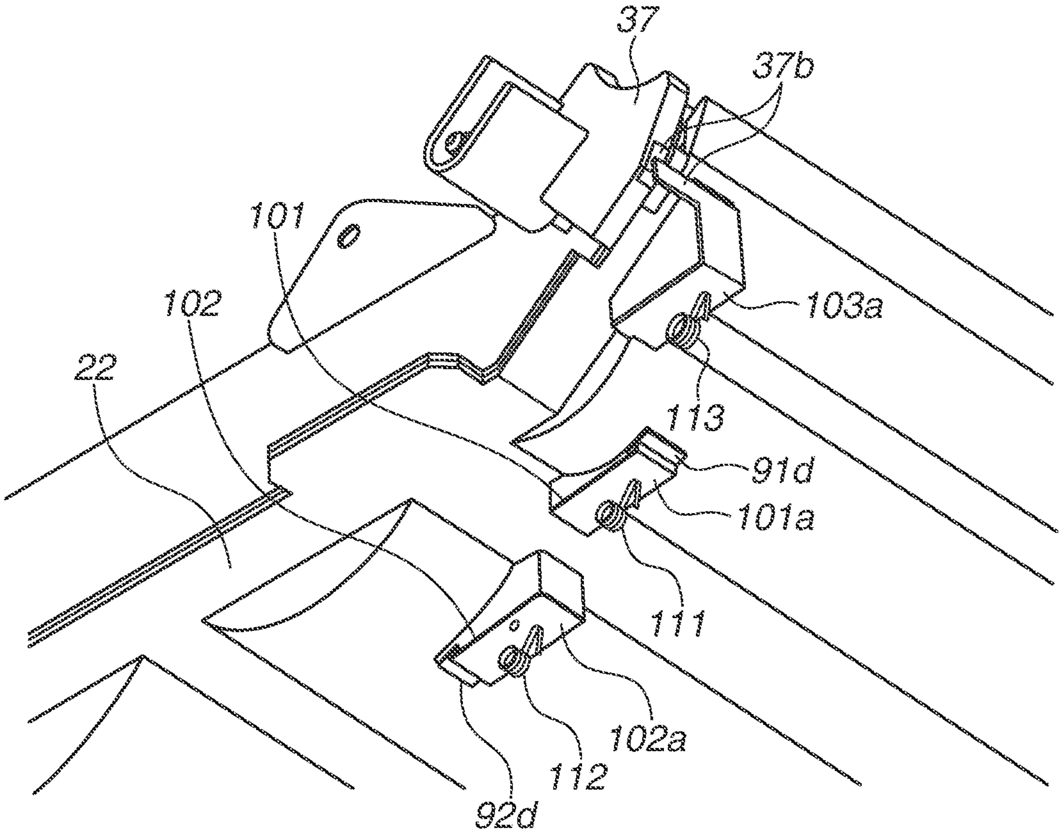
FIGS. 10A and 10B are a perspective view illustrating the development unit of the process cartridge and the main body of the image forming apparatus and a perspective view illustrating a bearing member of the process cartridge according to the first exemplary embodiment.
Figure 10B:
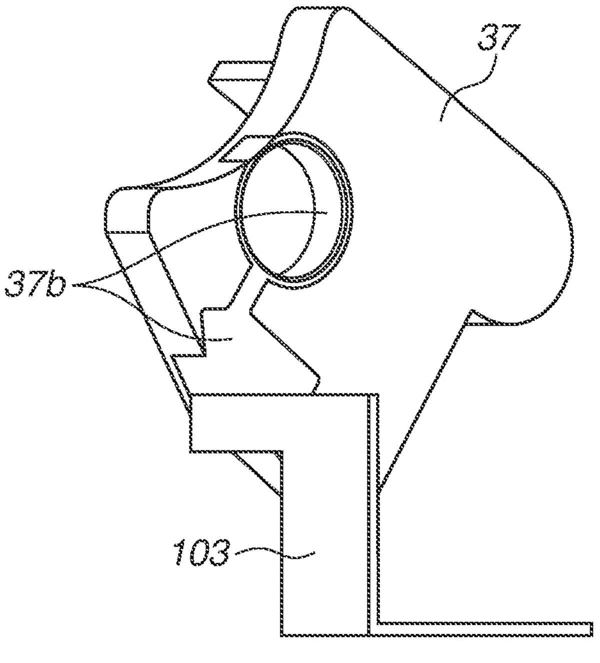
Figure 11A:
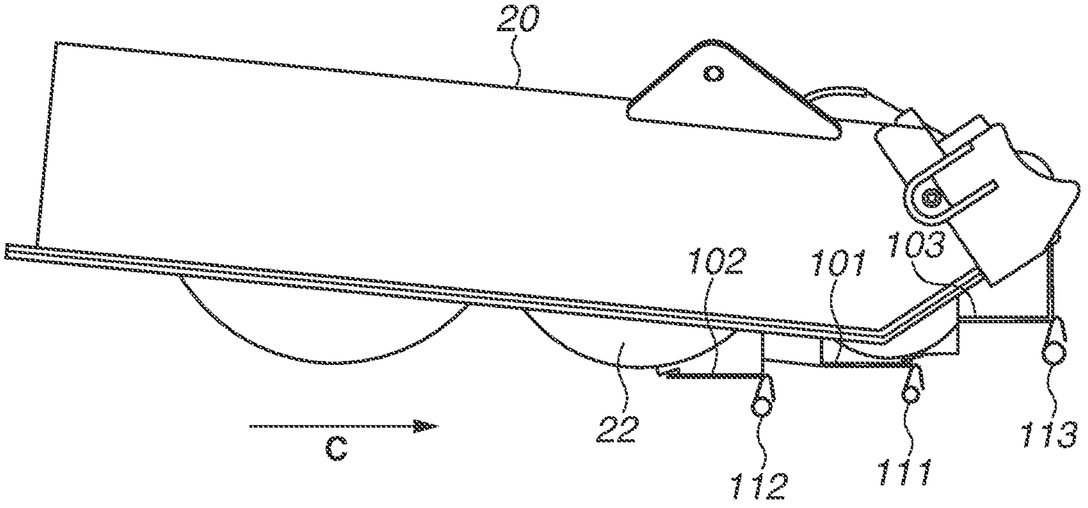
FIGS. 11A and 11B are side views illustrating the development unit of the process cartridge and the main body of the image forming apparatus according to the first exemplary embodiment.
Figure 11B:
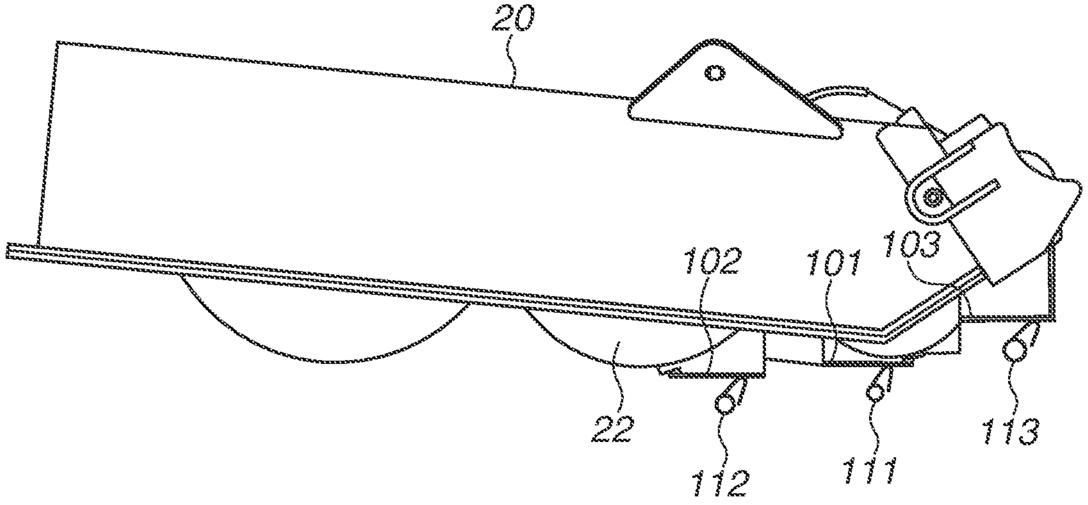
Figure 12:
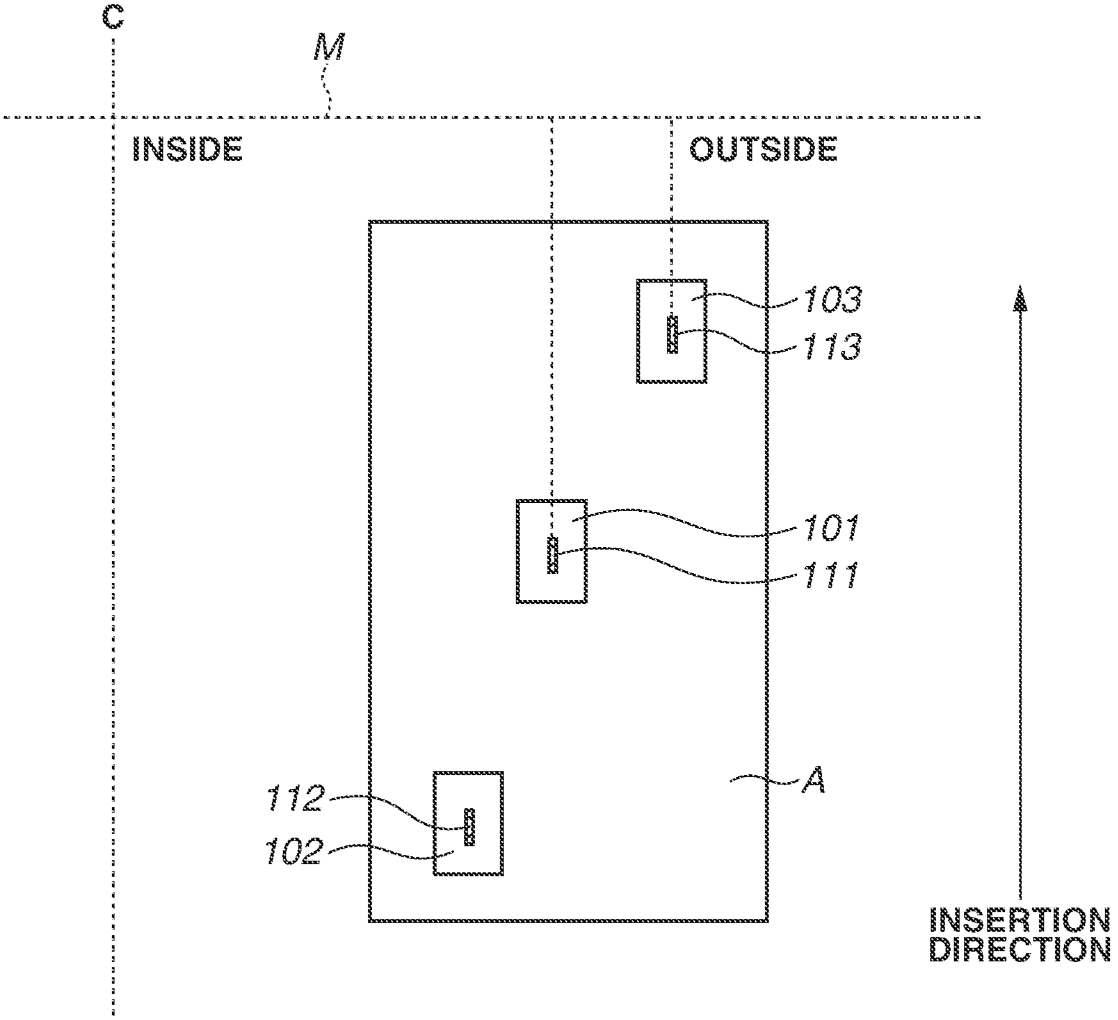
FIG. 12 is a cross sectional view illustrating the main body of the image forming apparatus according to the first exemplary embodiment.

Next, a remaining developer amount detection unit will be described below with reference to FIGS. 1, 9A, 9B, 10A, 10B, 11A, 11B, and 12. FIG. 1 is a cross sectional view illustrating the development unit 20 to illustrate the remaining developer amount detection unit. FIG. 9A is a cross sectional view illustrating the development unit 20 cut along a line G-G in FIG. 6A. FIG. 9B is a cross sectional view illustrating the vicinity of the non-driving-side end portion of the development unit 20 cut along a line K-K in FIG. 9A. FIG. 10A is a perspective view illustrating the remaining developer amount detection unit of the apparatus body A in addition to the cartridge B inserted in the apparatus body A when the development unit 20 is viewed from a direction N in FIG. 5B. FIG. 10B is a perspective view illustrating the bearing member 37 of the development roller 32 which is a part of the housing. FIGS. 11A and 11B are side views illustrating a structure relating to an electrical connection of the development unit 20 and the remaining developer amount detection unit of the apparatus body A when the cartridge B is inserted into the apparatus body A. FIG. 12 illustrates a portion relating to the electrical connection of the remaining developer amount detection unit of the apparatus body A.

As illustrated in FIG. 1, the bottom member 22 which is the housing is provided with a conductive member and a contact point connected to the conductive member. The conductive member is a detection unit configured to detect the amount of toner which is the amount of developer stored in the housing.

In the present exemplary embodiment, the case in which the conductive member is an electrode plate and the contact point is an electrode contact point plate will be described. According to the present exemplary embodiment, the housing is provided with two electrode plates, namely, the first electrode plate 91 as a first conductive member and the second electrode plate 92 as a second conductive member. Each of the first and second conductive members extends in the lengthwise direction of the development roller 32. The first electrode plate 91 is located closer to the development roller 32, which is the development sleeve, than the second electrode plate 92 is to the development roller 32. Further, as illustrated in FIG. 10A, a first electrode contact point plate 101, which is a first contact point, a second electrode contact point plate 102, which is a second contact point, and a development contact point plate, which is a development contact point, are provided on a surface located on the outer side (or opposite side) with respect to the toner chamber 29 of the bottom member 22. Specifically, the first electrode plate 91 is provided on one surface side of the bottom member 22 which is the housing, and the first electrode contact point plate 101 is provided on the other surface side on the opposite side. The same relationship applies to the second electrode plate 92 and the second electrode contact point plate 102 according to the present exemplary embodiment.

Further, in FIG. 1, the first electrode contact point plate 101, the second electrode contact point plate 102, and the development contact point plate 103 provided on the surface located on the outer side (or the surface located on the opposite side) with respect to the toner chamber 29 of the bottom member 22 are specified by dotted lines. The development contact point plate 103, which is the development contact point, the first electrode contact point plate 101, which is the first contact point, and the second electrode contact point plate 102, which is the second contact point, are disposed in this order from outside to inside in a perpendicular direction with respect to an insertion direction in which the cartridge B is inserted into the image forming apparatus.

Further, as illustrated in FIG. 1, the development roller 32 includes a sleeve 32*a* which is a conductive member. Further, as illustrated in FIG. 10B, the bearing member 37 which is a part of the housing is provided with a bearing member conductive resin portion 37*b* which is a conductive slide portion formed by molding two-color conductive resins. A part of the bearing member conductive resin portion 37*b* rotatably holds the development roller 32 and rubs the sleeve 32*a* of the development roller 32.

As illustrated in FIGS. 1 and 9A, the first electrode plate 91 and the second electrode plate 92 are disposed in such a way that a first surface 91*a* and a second surface 92*a* face the bottom member 22 which is the housing. Further, the second surface 92*a* facing the first surface 91*a* according to the present exemplary embodiment is disposed on the inner surface of the toner chamber 29 to be in contact with the toner which is the developer. While the second surface 92*a* is disposed to be in contact with the toner according to the present exemplary embodiment, a protection film may cover the first surface 91*a* and the second surface 92*a* facing the first surface 91*a*. Further, the first surface 91*a* and the second surface 92*a* each extend in the lengthwise direction of the developer carrying member. FIG. 9B illustrates the structure of a cross section of the first electrode plate 91 and the bottom member 22. The first electrode plate 91 passes through a hole portion 22*a* of the bottom member 22 in a non-driving-side end portion of the first surface 91*a* and is exposed to the outside of the toner chamber 29. A first exposed portion 91*d* is the portion of the first electrode plate 91 that is exposed to the outside of the toner chamber 29. The first electrode plate 91 is connected at the first exposed portion 91*d* to the first electrode contact point plate 101 which is the first contact point. While the electrode contact point plate connected to the exposed portion of the electrode plate is provided as a separate member according to the present exemplary embodiment, the exposed portion may directly be a contact point that is electrically connected to the contact point on the image forming apparatus side. In FIG. 9B, the first electrode contact point plate 101 is stacked on the first exposed portion 91*d*. While the structure of the first electrode plate 91 is illustrated in FIG. 9B, the above-described structure also applies to the second electrode plate 92, and the second electrode plate 92 includes a second exposed portion 92*d* corresponding to the first exposed portion 91*d* (see FIG. 10A). Further, the second exposed portion 92*d* is connected to the second electrode contact point plate 102 which is the second contact point. In this case, the second electrode contact point plate 102 is similarly stacked on the second exposed portion 92*d* to cover the second exposed portion 92*d*. Further, as illustrated in FIG. 10B, the bearing member conductive resin portion 37*b* of the bearing member 37 rotatably supports the sleeve 32*a* of the development roller 32 to be electrically connected to the sleeve 32*a* of the development roller 32. Further, the development contact point plate 103 is connected to the bearing member conductive resin portion 37*b*.

As illustrated in FIG. 1, the non-driving-side end portion of the first surface 91*a* extends to the first electrode contact point plate 101 in the lengthwise direction of the developer carrying member. A non-driving-side end portion of the second surface 92*a* extends to the second electrode contact point plate 102 in the lengthwise direction of the developer carrying member. As illustrated in FIG. 9B, the first exposed portion 91*d* and the second exposed portion 92*d* are provided on the non-driving-side end portions of the electrode plates 91 and 92 according to the present exemplary embodiment. The first exposed portion 91*d* and the second exposed portion 92*d* may be provided on the end portions so that the shapes of the vicinities of the first exposed portion 91*d* and the second exposed portion 92*d* can be simplified by reducing the number of bends, etc. Furthermore, no electrode plate may be provided on the non-driving side of the electrode contact point plates 101 and 102 so that costs such as material costs can be reduced.

Further, as illustrated in FIG. 10A, the apparatus body A includes a first pressing portion 111, a second pressing portion 112, and a development pressing portion 113 which are main body contact points electrically connectable to the contact points of the cartridge B. According to the present exemplary embodiment, the first pressing portion 111, the second pressing portion 112, and the development pressing portion 113 are a first main body contact point, a second main body contact point, and a development main body contact point, respectively, and are electrically connectable to the contact points of the cartridge B. The first pressing portion 111, the second pressing portion 112, and the development pressing portion 113 each include a twisted coil spring and are disposed rotatably within a predetermined angle range around the center of the twisted coil spring. Further, the first electrode contact point plate, the second electrode contact point plate, and the development contact point plate (101, 102, 103) respectively correspond to a first pressed portion, a second pressed portion, and a development pressed portion (101*a*, 102*a*, 103*a*). The first pressed portion, the second pressed portion, and the development pressed portion (101*a*, 102*a*, 103*a*) respectively abut on the first pressing portion, the second pressing portion, and the development pressing portion (111, 112, 113) of the apparatus body A to be electrically connected. The first pressed portion 101*a*, the second pressed portion 102*a*, and the development pressed portion 103*a* are all disposed to face downward in the vertical direction.

Further, as illustrated in FIG. 1, the first electrode contact point plate 101 and the second electrode contact point plate 102 are disposed at different positions in the lengthwise direction of the developer carrying member or the perpendicular direction with respect to the insertion direction in which the development device is inserted into the image forming apparatus.

Further, as illustrated in FIG. 12, the first and second pressing portions 111 and 112 are disposed not to overlap in a perpendicular direction M (according to the present exemplary embodiment, the perpendicular direction M is the same direction as the lengthwise direction of the developer carrying member) which is perpendicular to the insertion direction when the cartridge B is inserted into the apparatus body A. Further, the development contact point plate 103, which is the development contact point, the first electrode contact point plate 101, which is the first contact point, and the second electrode contact point plate 102, which is the second contact point, are disposed in this order from outside toward inside (or the center of the cartridge B in the lengthwise direction) of the cartridge B in the perpendicular direction M. In other words, the first contact point is disposed on a more inner side than the development contact point in the perpendicular direction with respect to the insertion direction in which the cartridge B is inserted into the image forming apparatus. Further, the second contact point is disposed on a more inner side than the first contact point in the perpendicular direction with respect to the insertion direction in which the cartridge B is inserted into the image forming apparatus. Further, from another point of view, the first contact point is disposed between the second contact point and the development contact point. Further, the first contact point is disposed between the center of the cartridge B in the lengthwise direction and the development contact point. Further, the second contact point is disposed between the center of the cartridge B in the lengthwise direction and the first contact point. Further, the second contact point is disposed between the center of the cartridge B in the lengthwise direction and the development contact point. The first contact point, the second contact point, and the development contact point are disposed at predetermined intervals (predetermined distances) not to overlap in an orthogonal direction (which is the same direction as the insertion direction in which the cartridge B placed on the cartridge tray 18 is inserted) with respect to the lengthwise direction. Accordingly, when the cartridge B is inserted into the image forming apparatus, the first main body contact point of the apparatus body A does not come into contact with the second electrode contact point plate 102 which is the second contact point of the cartridge B. Further, when viewed from the insertion direction (one of the directions orthogonal to the lengthwise direction of the developer carrying member) in which the cartridge B is inserted into the image forming apparatus, the development contact point is disposed upstream with respect to the first contact point and the second contact point is disposed downstream with respect to the first contact point. In the present exemplary embodiment, the positional relationship of the contact points is described based on the positions of the outside end portions of the contact points in the perpendicular direction M. Alternatively, the positional relationship may be considered based on the abutment positions of the main body contact points.

A process will be described by which the remaining developer amount detection unit is connected to the apparatus body A when the cartridge B is attached to (or inserted into) the apparatus body A. As illustrated in FIG. 4B, the cartridge B is moved in the direction of an arrow C, which is the insertion direction, until the cartridge B is attached to the apparatus body A. FIG. 11A illustrates a state before the cartridge B is completely attached to the apparatus body A and immediately before the first electrode contact point plate 101, the second electrode contact point plate 102, and the development contact point plate 103 respectively come into contact with the first pressing portion 111, the second pressing portion 112, and the development pressing portion 113.

If the cartridge B is moved further in the direction of the arrow C from this state, the first pressed portion 101*a* pushes the first pressing portion 111 downward, the second pressed portion 102*a* pushes the second pressing portion 112 downward, and the development pressed portion 103*a* pushes the development pressing portion 113 downward. FIG. 11B illustrates the state in which the cartridge B is completely attached to the apparatus body A, and at this time the position of the cartridge B is determined. When the cartridge B is completely attached to the apparatus body A, the first pressing portion 111, the second pressing portion 112, and the development pressing portion 113 respectively press the first pressed portion 101*a*, the second pressed portion 102*a*, and the development pressed portion 103*a* due to the resilience of the respective twisted coil springs. An arrangement in which the first electrode contact point plate 101 and the second electrode contact point plate 102 are disposed to overlap on the straight line of the insertion direction of the cartridge B will be discussed below. This arrangement can also be described as an arrangement in which the first electrode contact point plate 101 and the second electrode contact point plate 102 are disposed in corresponding positions in the perpendicular direction M (or the lengthwise direction of the developer carrying member). This arrangement is different from the arrangement illustrated in FIG. 12. In this case, the first pressing portion 111 and the second pressing portion 112 are both disposed to overlap in the insertion direction (orthogonal direction to the lengthwise direction of the cartridge B) of the cartridge B. In this case, when the cartridge B is attached in the direction of the arrow C, the first electrode contact point plate 101 is moved onto the second pressing portion 112, moved further while rubbing, and then inserted to cancel the contact. Similarly, when the cartridge B is removed in the opposite direction to the direction of the arrow C, the first electrode contact point plate 101 is moved onto and over the second pressing portion 112. In this arrangement, the movement generates a load during the attachment or removal of the cartridge B, so the cartridge B is less likely to be attached to or removed from the apparatus body A smoothly.

In the present case, the development contact point plate 103, the first electrode contact point plate 101, and the second electrode contact point plate 102 are staggered in the perpendicular direction M. Further, similarly, the development pressing portion 113, the first pressing portion 111, and the second pressing portion 112 are staggered in the perpendicular direction M. In this way, when the cartridge B is moved in the direction of the arrow C, the first electrode contact point plate 101 is not likely to be moved onto the second pressing portion 112. Similarly, the development contact point plate 103 is not likely to come into contact with the first pressing portion 111 and the second pressing portion 112 and is, therefore, not likely to be moved onto the first pressing portion 111 and the second pressing portion 112. For this reason, the path along which the cartridge B is moved in the direction of the arrow C can be simplified to reduce the size of the apparatus body A.

Further, as illustrated in FIGS. 10A, 10B, 11A, and 11B, the contact points are provided on not the side surface but the bottom surface of the toner chamber 29. This makes it unnecessary to provide an additional member to extend the contact points to the position of the side surface of the cartridge B in the lengthwise direction, so the structure can be simplified. According to the present exemplary embodiment, the contact points are exposed on the bottom surface.

Next, a process of detecting the remaining amount of developer will be described below with reference to FIG. 9A. When a development bias power supply 130 which is a voltage application unit applies an alternating current (AC) voltage to the development roller 32, a current corresponding to the electrostatic capacitance between the development roller 32 and the first surface 91*a* is induced between the development roller 32 and the first surface 91*a*.

Further, when the development bias power supply 130 which is the voltage application unit applies an AC voltage to the second electrode plate 92, a current corresponding to the electrostatic capacitance between the first surface 91*a* and the second surface 92*a* facing the first surface 91*a* is induced. The electrostatic capacitance between the development roller 32 and the first surface 91*a* changes according to the amount of toner which is the amount of developer between the development roller 32 and the first surface 91*a*. The electrostatic capacitance between the first surface 91*a* and the second surface 92*a* changes according to the amount of toner which is the amount of developer between the first surface 91*a* and the second surface 92*a*.

Further, the value of current passing through the first electrode plate 91 is converted into a voltage value via the first electrode contact point plate 101 and measured by a developer amount detection device 131 which is the detection unit in the apparatus body A. Alternatively, the current may be detected directly.

The following describes a change in the state of the toner in the development unit 20 throughout the lifetime of the cartridge B. In an initial stage of the lifetime (e.g., when the cartridge B is unused or brand-new), the inside of the development unit 20 is substantially filled with the toner which is the developer. As the cartridge B is used and comes to the end of the lifetime, the overall amount of toner in the development unit 20 decreases. Meanwhile, the toner is conveyed toward the development roller 32 by the first, second, and third conveyance members (43, 44, 50) in the development unit 20, so the amount of toner is larger at smaller distances from the development roller 32. Specifically, while the amount of toner which is the amount of developer in the entire cartridge B (or housing) is decreased, an amount by which the amount of toner in a region near the development roller 32 (e.g., region from the development roller 32 to the first conveyance member 43) is decreased is small. Therefore, the amount of toner is larger in the region near the development roller 32 than in other regions. Thus, to detect a state in which the amount of remaining toner which is the amount of remaining developer is small, the accuracy of the detection of the amount of remaining developer between the development roller 32 and the first surface 91*a* needs to be higher than that between the first surface 91*a* and second surface 92*b*. High detection accuracy is required especially in the case of a cartridge capable of storing a large amount of developer in the cartridge (or housing).

According to the present exemplary embodiment, as illustrated in FIG. 1, the second electrode contact point plate 102 is disposed in a region I between the first electrode contact point plate 101 and a lengthwise center C of the development roller 32 in the perpendicular direction M with respect to the insertion direction of the cartridge B or the lengthwise direction of the developer carrying member. Specifically, the second electrode contact point plate 102 is disposed between the first electrode contact point plate 101 and the center of the development roller 32 in the lengthwise direction.

Further, according to the present exemplary embodiment, as illustrated in FIG. 1, the first contact point is disposed on a more inner side than the development contact point in the perpendicular direction with respect to the insertion direction in which the cartridge B is inserted into the image forming apparatus. Further, the second contact point is disposed on a more inner side than the first contact point in the perpendicular direction with respect to the insertion direction in which the development device is inserted into the image forming apparatus.

The above-described arrangement allows the conductive members to be provided up to the vicinity of the end portion of the bottom member 22, which is the housing, in the lengthwise direction of the development roller 32. For this reason, the width of the first surface 91*a* in the lengthwise direction which requires accurate detection of the amount of remaining developer due to the small distance from the development roller 32 can be set larger than the width in the lengthwise direction of the second surface 92*a*. This enables accurate detection of the amount of remaining toner in the vicinity of the development roller 32.

In the present arrangement, the first exposed portion 91*d* and the second exposed portion 92*d* are provided at the bottom portion of the bottom member 22 so that the contact points do not need to be provided at the side surface of the cartridge B. This makes it unnecessary to extend the electrode plates to the vicinity of a side wall on the non-driving-side, so costs can be reduced. Further, the width of the first electrode plate 91 located closer to the development roller 32 than the second electrode plate 92 is to the development roller 32 is kept long to enable accurate detection of the amount of remaining developer in the vicinity of the development roller 32.

Next, a second exemplary embodiment will be described below. According to the second exemplary embodiment, an electrode sheet is used in place of the electrode plate 91. Being a sheet, the electrode sheet alone is flexible. According to the present exemplary embodiment, the electrode sheet to which conductivity is imparted is used as a conductive resin member. While the conductive resin member in which a conductive material such as carbon black is dispersed in a resin is used in the present exemplary embodiment, the conductive resin member is not limited to the above-described conductive resin member, and any material of a resin having conductivity may be used.

In the second exemplary embodiment, differences from the first exemplary embodiment will be described in detail below. Unless otherwise specified, materials, shapes, etc. are similar to those according to the first exemplary embodiment. The similar components are given the same reference numerals, and detailed description thereof is omitted.

Figure 13:
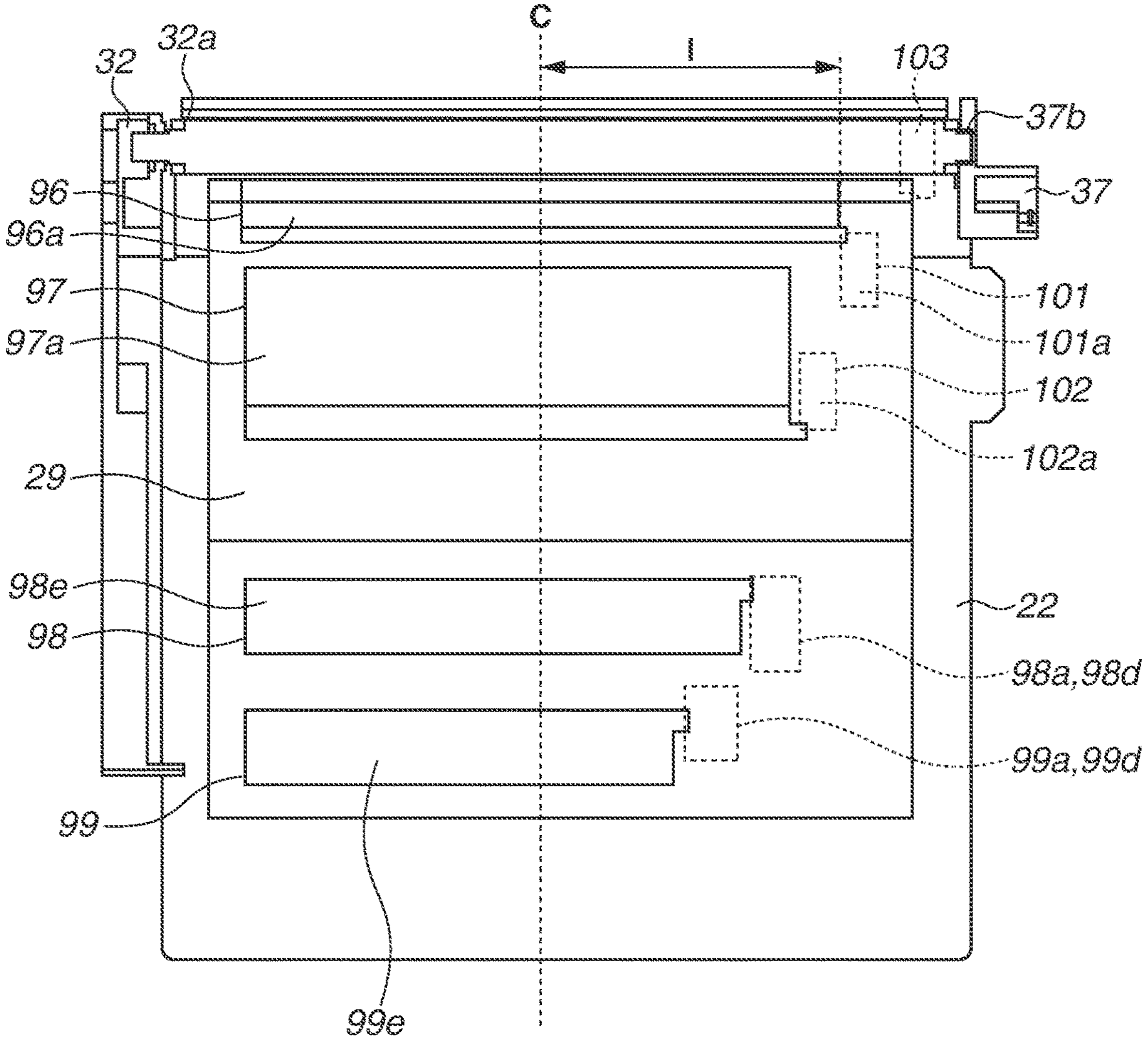
FIG. 13 is a cross sectional view illustrating a development unit of a process cartridge according to a second exemplary embodiment.

According to the second exemplary embodiment, as illustrated in FIG. 13, a first electrode sheet 96 is provided in place of the first electrode plate 91, and a second electrode sheet 97 is provided in place of the second electrode plate 92. The first electrode sheet 96 and second electrode sheet 92 are conductive resin sheets. The first electrode sheet 96 includes a first surface 96*a* corresponding to the first surface 91*a* of the first electrode plate 91, and the second electrode sheet 97 includes a second surface 97*a* corresponding to the second surface 92*a* of the second electrode plate 92. The arrangement of the electrode sheets is similar to the arrangement according to the first exemplary embodiment.

According to the second exemplary embodiment, a third electrode sheet 98 and a fourth electrode sheet 99 are further provided. The third electrode sheet 98, which is a third conductive member, and the fourth electrode sheet 99, which is a fourth conductive member, are provided so that even the amount of developer in the farthest storage unit from the development roller 32 is detectable in order to successively detect the amount of developer in the cartridge B. A third electrode contact point plate 98*a* is provided on the back surface of the bottom member 22, which is the housing, on an end portion side of the third electrode sheet 98 in the lengthwise direction of the cartridge. Similarly, a fourth electrode contact point plate 99*a* is provided on the back surface of the bottom member 22, which is the housing, on an end portion side of the fourth electrode sheet 99 in the lengthwise direction of the cartridge. While four electrode sheets are used in the second exemplary embodiment, three electrode sheets may be used.

<Brief Description of Method of Producing Developer Storage Container>

Figure 14A:
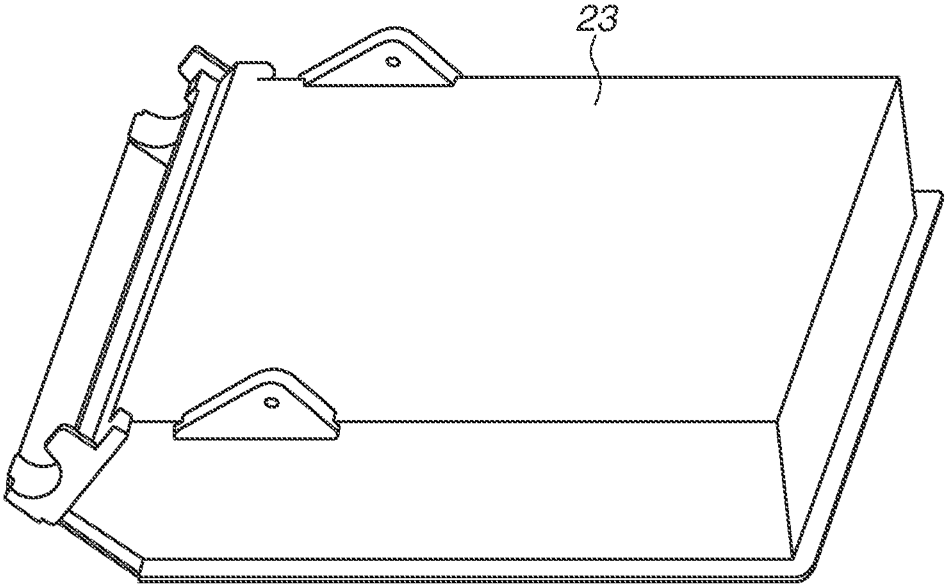
FIGS. 14A and 14B are perspective views illustrating a developer storage container of the process cartridge according to the second exemplary embodiment.
Figure 14B:
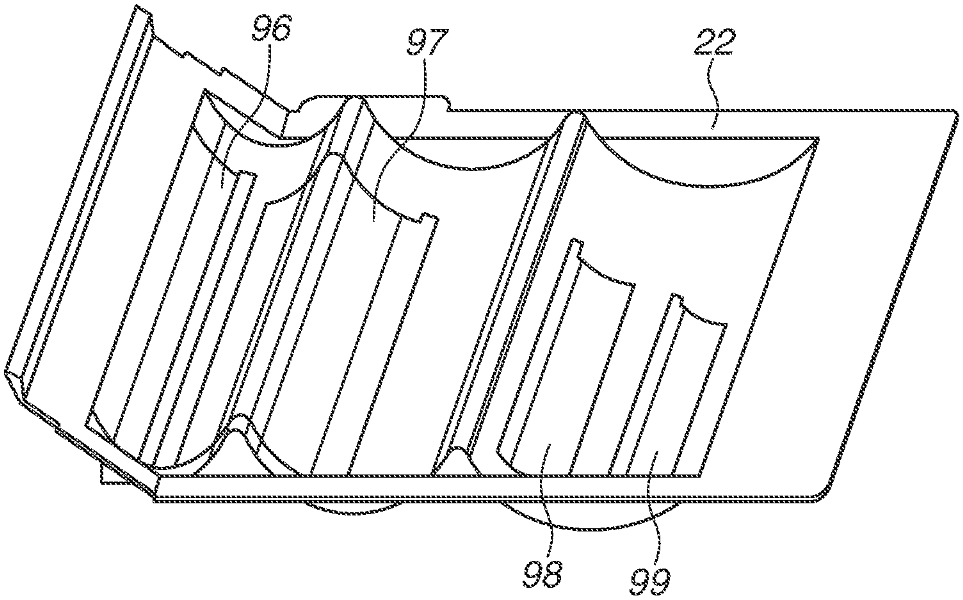
Figure 15A:
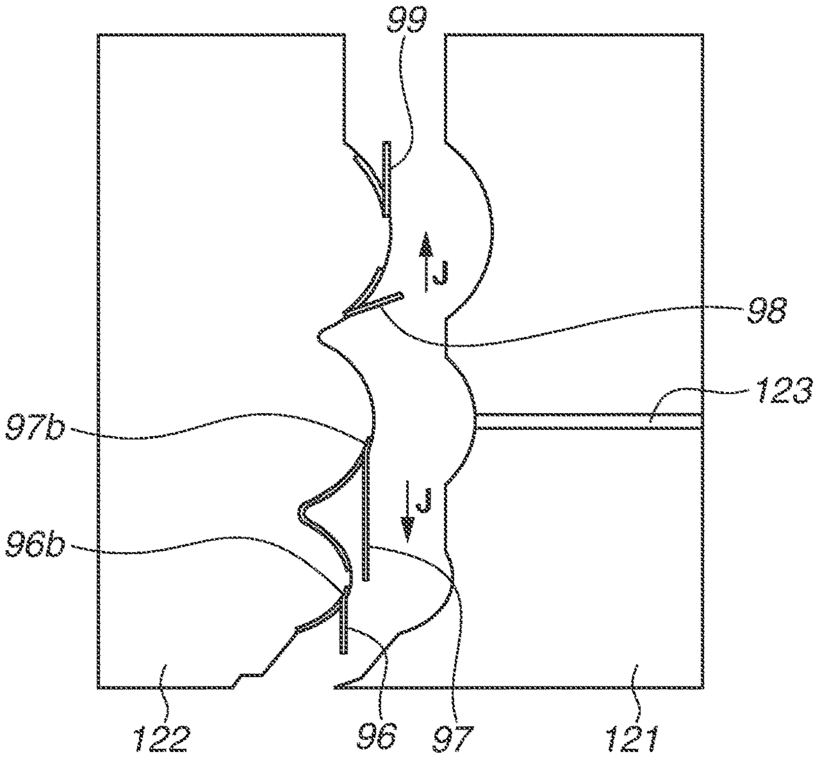
FIGS. 15A and 15B are cross sectional views illustrating molds for use in manufacturing the developer storage container of the process cartridge according to the second exemplary embodiment.
Figure 15B:
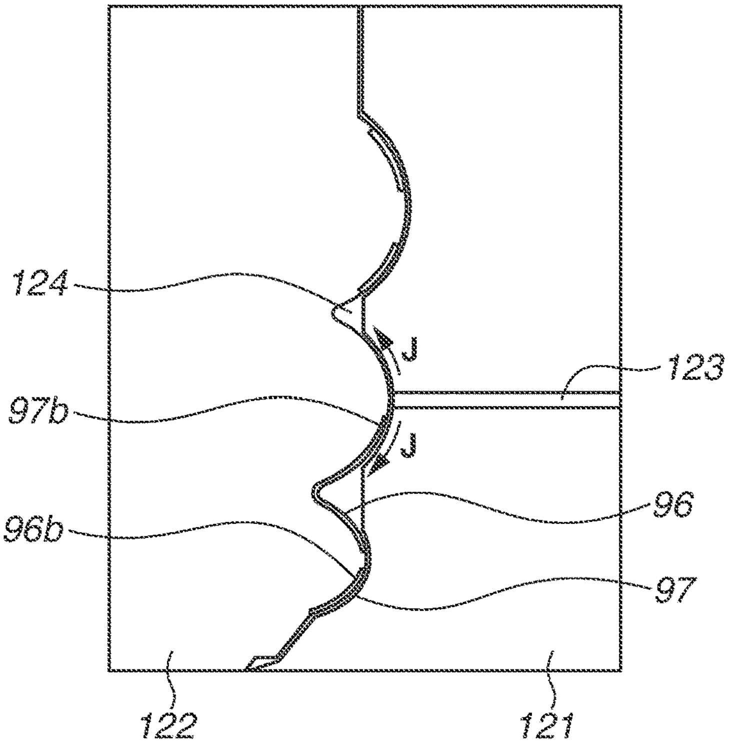

A manufacturing method of molding the bottom member 22 by inserting the first electrode sheet 96 and the second electrode sheet 97 according to the second exemplary embodiment will be described below with reference to FIGS. 14A, 14B, 15A, and 15B. FIGS. 14A and 14B are perspective views illustrating a developer storage container to illustrate the method of manufacturing a developer storage container. FIGS. 15A and 15B are cross sectional views illustrating molds to illustrate the method of manufacturing a developer storage container.

As illustrated in FIGS. 14A and 14B, the developer storage container includes the developer container 23 and the bottom member 22 as described above. The first electrode sheet 96 and the second electrode sheet 97 are formed integrally with the bottom member 22.

FIGS. 15A and 15B illustrate an example of a cross sectional view of an entire mold for molding the bottom member 22. FIG. 15A illustrates a state in which the mold is opened, and FIG. 15B illustrates a state in which the mold is closed.

A first mold 121 and a second mold 122 are provided, and a shape corresponding to the shape of the surface of the bottom member 22 is formed on each of the first mold 121 and the second mold 122. The first mold 121 is provided with an injection opening (gate) 123 through which a resin is injected into the mold.

First, while the mold in FIG. 15A is opened, four sheets that are the first electrode sheet 96 to the fourth electrode sheet 99 are inserted into the mold.

The first electrode sheet 96 and the second electrode sheet 97 respectively include a first suctioned portion 96*b* and a second suctioned portion 97*b*. Similarly, the third electrode sheet 98 and the fourth electrode sheet 99 respectively include a third suctioned portion 98*b* and a fourth suctioned portion 99*b*. Fine air holes are formed in the surface of the second mold 122 that corresponds to the first suctioned portion 96*b* to the fourth suctioned portion 99*b*. The air holes are connected to a suction device (not illustrated) to suction air through the air holes so that the first electrode sheet 96 to the fourth electrode sheet 99 are adsorbed and fixed onto the second mold 122.

Next, as illustrated in FIG. 15B, the first mold 121 and the second mold 122 are put together (closed). A molten resin is injected through the injection opening 123 into a void portion (cavity) 124 formed when the first mold 121 and the second mold 122 are put together. The molten resin is cured while being pressed against the first electrode sheet 96 to the fourth electrode sheet 99 so that the bottom member 22 is molded integrally with the first electrode sheet 96 to the fourth electrode sheet 99. Further, during the molding, the resin in the void portion 124 flows from the injection opening 123 toward an end portion of the shape to be molded. Thus, the injection opening 123 can be defined as upstream, whereas the end portion of the shape to be molded can be defined as downstream. The resin injected from the injection opening 123 flows in the direction of an arrow J from upstream toward downstream to mold the shape of the bottom member 22.

While the case in which the four resin sheets that are the first electrode sheet 96 to the fourth electrode sheet 99 are inserted into the mold is described above, a desired number of resin sheets can be inserted as needed using the same method.

<Electrode Sheet Insertion Molding>

Figure 16A:
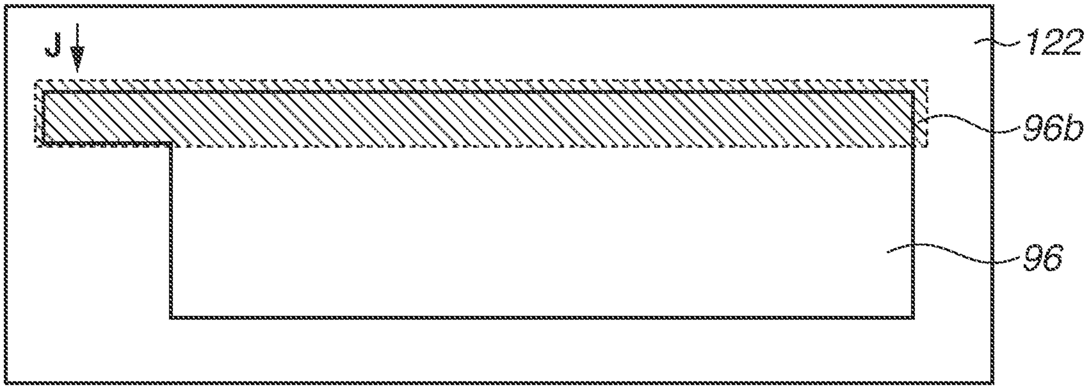
FIGS. 16A to 16C are front views illustrating the molds for use in manufacturing the developer storage container of the process cartridge and a conductive member of the process cartridge according to the second exemplary embodiment.
Figure 16B:
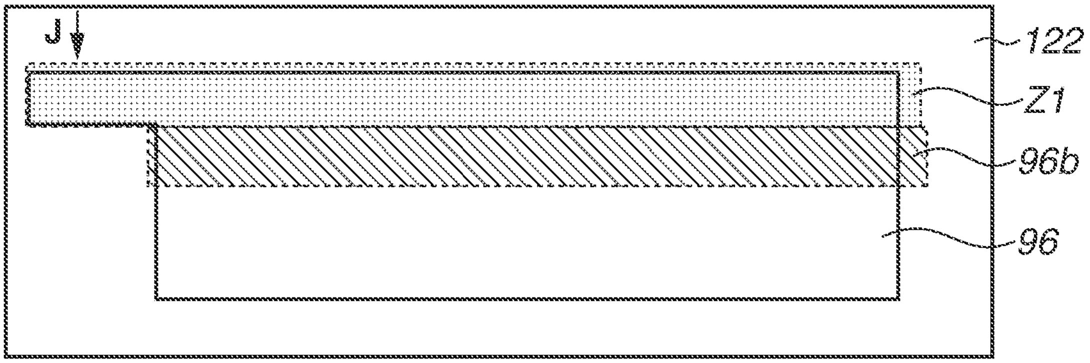
Figure 16C:
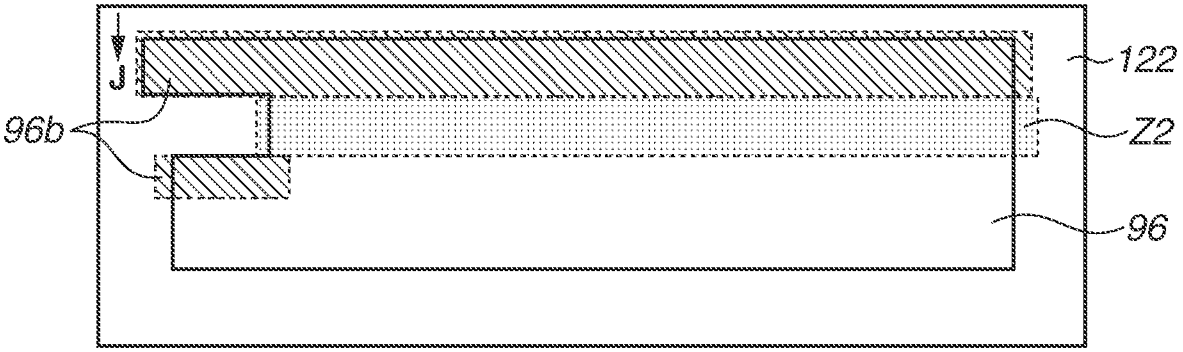

Next, the behavior of the first electrode sheet 96 inserted into the mold during the manufacture of the developer storage container will be described in detail below with reference to FIGS. 16A, 16B, 16C, 17A, and 17B. FIGS. 16A, 16B, and 16C illustrate a possible problem that can occur when a fixing position is changed while the first electrode sheet 96 is fixed to the second mold 122.

Figure 17A:
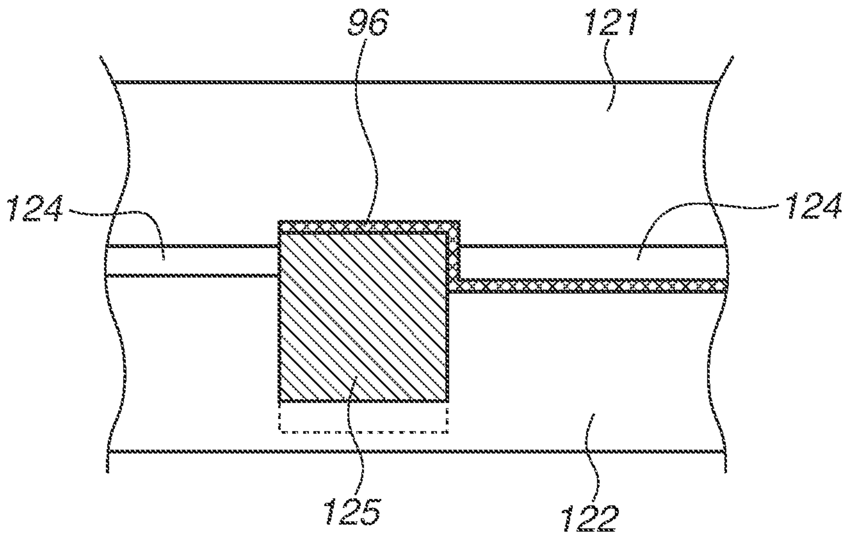
FIGS. 17A and 17B are cross sectional views illustrating the molds for use in manufacturing the developer storage container of the process cartridge and the conductive member of the process cartridge according to the second exemplary embodiment.
Figure 17B:
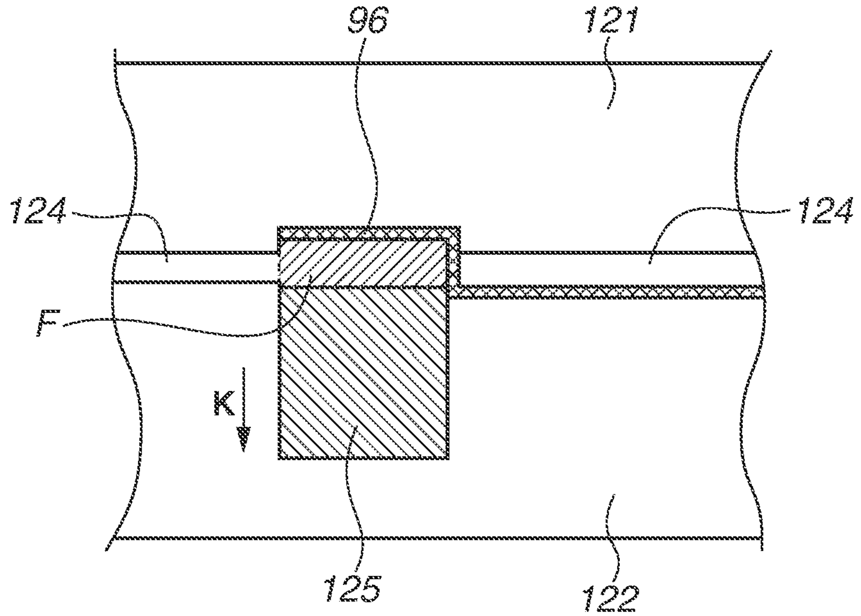

FIGS. 17A and 17B are cross sectional views illustrating the first mold 121, the second mold 122, and the first electrode sheet 96 to illustrate a structure at the time of molding the bottom member 22 near a slide plug 125 of the second mold 122.

As illustrated in FIG. 16A, the first suctioned portion 96*b* of the first electrode sheet 96 which is provided at an upstream end portion of the first electrode sheet 96 is adsorbed and fixed onto the second mold 122 by the fine air holes (not illustrated) formed in the surface of the second mold 122.

The first suctioned portion 96*b* has the role of fixing the relative position to the mold in the direction of the arrow J of the resin when the resin flows in the direction of the arrow J.

Next, the arrangement in which the first suctioned portion 96*b* is disposed on the downstream side of the upstream end portion of the first electrode sheet 96 as illustrated in FIG. 16B will be described below. In the case in which the first suctioned portion 96*b* is disposed on the downstream side of the upstream end portion of the first electrode sheet 96, the first suctioned portion 96*b* may be pressed by the molten resin flowing from upstream in the direction of the arrow J. At this time, the upstream end portion of the first electrode sheet 96 which is located on the upstream side of the first suctioned portion 96*b* in the direction of the arrow J may be separated from the second mold 122. Consequently, the molten resin may flow between the first electrode sheet 96 and the second mold 122 in a region Z1 which is a portion of the first electrode sheet 96 that is on the upstream side of the first suctioned portion 96*b*. As a result, a part of the first surface 96*a* in the region Z1 may be unexposed to the toner supply chamber 28 and covered by the resin due to the molded bottom member 22. The covering resin may affect the electrostatic capacitance between the development roller 32 and the first surface 91*a* or the electrostatic capacitance between the first surface 91*a* and the second surface 92*a* to decrease the accuracy of the detection of the amount of remaining developer.

Further, the case in which the first suctioned portion 96*b* is divided and disposed as illustrated in FIG. 16C will be described below. In the case in which the first suctioned portion 96*b* is divided and disposed, the molten resin flowing from upstream along the direction of the arrow J may flow into a region Z2 formed between the first suctioned portions 96*b*. Then, the flowing molten resin may push the first electrode sheet 96 in the region Z2 to separate the first electrode sheet 96 in the region Z2 from the second mold 122. As a result, the molten resin may flow between the first electrode sheet 96 and the second mold 122 in the region Z2, and a part of the first surface 96*a* in the region Z2 may be unexposed to the toner supply chamber 28 and covered by the resin at the molded bottom member 22. Consequently, the covering resin may affect the electrostatic capacitance between the development roller 32 and the first surface 91*a* or the electrostatic capacitance between the first surface 91*a* and the second surface 92*a* to decrease the accuracy of the detection of the amount of remaining developer.

Specifically, the suctioned portions of the electrode sheets are disposed upstream of the flow of the resin to accurately arrange the electrode sheets at designed positions on the housing. For this reason, the first suctioned portion 96*b* is desirably disposed on the upstream end portion as illustrated in FIG. 16A.

Next, the behavior of a first exposed portion 96*d* of the first electrode sheet 96 which is a portion exposed to the outside of the toner chamber 29 during the manufacture of the developer storage container will be described below. The second to fourth electrode sheets (97 to 99) include second to fourth exposed portions (97*d*, 98*d*, 99*d*) corresponding to the first exposed portion 96*d*.

As illustrated in FIGS. 17A and 17B, the second mold 122 includes the slide plug 125. The slide plug 125 is movable between an entry position and an exit position in a direction from the second mold 122 toward the first mold 121.

FIG. 17A illustrates the slide plug 125 at the entry position, and FIG. 17B illustrates the slide plug 125 at the exit position.

When the first mold 121 and the second mold 122 are put together (closed), the slide plug 125 is moved to the entry position in FIG. 17A. At this time, the first electrode sheet 96 is sandwiched between the slide plug 125 and the first mold 121. Next, the molten resin is injected from the injection opening 123 into the void portion 124.

Thereafter, before the molten resin is completely cured, the slide plug 125 is moved to the exit position in FIG. 17B (in the direction of an arrow K). Then, the molten resin flows into a region F formed as a result of the movement of the slide plug 125 from the entry position to the exit position. In this way of molding, the first electrode sheet 96 and the second electrode sheet 97 are inserted and molded in the bottom member 22.

Further, as illustrated in FIGS. 9A and 9B, the developer storage container manufactured by the above-described manufacturing method has a structure in which the non-driving-side end portion of the first surface 96*a* of the first electrode sheet 96 comes into the bottom member 22 and the first exposed portion 96*d* is exposed to the outside of the toner chamber 29.

As illustrated in FIGS. 17A and 17B, the first electrode sheet 96 includes a detection unit having the first surface 96*a*, a relay unit formed through the inside of the housing and connected to the first exposed portion 96*d*, and the first exposed portion 96*d*. Not only the first electrode sheet 96 but also the second to fourth electrode sheets 97 to 99 have the above-described structure. Specifically, the electrode sheets are disposed on the housing and include the detection unit, the relay unit, and the exposed portion.

As described above, the first electrode sheet 96 is connected to the first electrode contact point plate 101 at the first exposed portion 96*d*.

<Electrode as Remaining Developer Amount Detection Unit>

Next, physical properties of the first electrode sheet 96 and the second electrode sheet 97 will be described in detail below.

In the present exemplary embodiment, a resin sheet having a thickness of 0.1 mm is used. As used herein, the term "conductive" refers to a surface resistivity of 10 kΩ/sq or lower as measured by a measurement method stipulated in JIS K 7194, and the term "not conductive" refers to a surface resistivity that is higher than 10 kΩ/sq.

An ethylene-vinyl acetate copolymer (EVA) resin in which carbon black is dispersed is used as a material of a conductive resin sheet.

According to the present exemplary embodiment, the EVA resin is bonded to a polystyrene (PS) resin with the heat and pressure applied during the molding of the bottom member 22 using the above-described molding method to integrally form the electrode sheets, which are conductive resin sheets, and the bottom member 22.

The physical properties, materials, etc. are not limited to those described above, and any other resin sheets having a thickness other than that specified above and any other combinations of resin materials may be used.

More specifically, while the resin sheet having a thickness of 0.1 mm is selected from the point of view of an influence on housing distortion, transferability to housing shape, and conductivity in the present exemplary embodiment, the thickness of the resin sheet may be selected as appropriate. Further, while the EVA resin which is adhesive to the material of the bottom member 22 is selected as a material of the resin sheet, a resin having compatibility to melt with the resin of the bottom member 22 to be combined without an interface can be used as a material of the resin sheet.

Further, as to the heat distortion temperatures (glass transition temperatures) of the resins used in the present exemplary embodiment, the resin used in the bottom member 22 has a heat distortion temperature of about 90 degrees Celsius, and the ethylene-vinyl acetate copolymer (EVA) resin used in the remaining developer amount detection member which is the conductive resin sheet has a heat distortion temperature of about 80 degrees Celsius.

The above-specified heat distortion temperatures of the bottom member 22 and the electrode sheets are mere examples, and the heat distortion temperatures are not limited to those specified above as long as the heat distortion temperature of the resin to be used to form the electrode sheets is lower than the heat distortion temperature of the resin to be used to form the housing.

<Remaining Developer Amount Detection Unit>

The electrode sheets are inserted into the developer storage container and molded as described above.

According to the present exemplary embodiment, as illustrated in FIG. 13, the development contact point plate 103, the first electrode contact point plate 101, the second electrode contact point plate 102, the third electrode contact point plate 98*a*, and the fourth electrode contact point plate 99*a* are disposed in this order from outside toward the lengthwise center C in the lengthwise direction of the cartridge. The above arrangement is described based on the positions of outside end portions of the members such as the development contact point plate 103 in the lengthwise direction of the cartridge. The first electrode contact point plate 101 is disposed between the development contact point plate 103 and the second electrode contact point plate 102. Further, the second electrode contact point plate 102 to the fourth electrode contact point plate 99*a* are disposed in the region I between the first electrode contact point plate 101 and the lengthwise center C of the development roller 32. The third electrode contact point plate 98*a* is disposed between the second electrode contact point plate 102 and the fourth electrode contact point plate 99*a*.

The above-described arrangement is employed so that the width of the first surface 96*a*, which is located close to the development roller 32, in the lengthwise direction which requires accurate detection of the amount of remaining developer is set larger than the width of the second surface 97*a* in the lengthwise direction.

Similarly, the lengths of the first surface 96*a*, the second surface 97*a*, a third surface 98*e* of the third electrode sheet 98, and a fourth surface 99*e* of the fourth electrode sheet 99 in the lengthwise direction decrease in this order. Specifically, according to the present exemplary embodiment, the first surface 96*a* has the longest length in the lengthwise direction, and the fourth surface 99*e* has the shortest length.

In the above-described arrangement, the contact points do not have to be disposed on the side surface of the cartridge, and the electrode sheets do not have to be extended to the side surface, so costs are reduced. Further, the width of the first electrode sheet located at the smallest distance from the development roller which is the developer carrying member can be set larger to enable accurate detection of the amount of remaining developer.

Next, a third exemplary embodiment will be described below. In the third exemplary embodiment, differences from the second exemplary embodiment (location of the development contact point plate 103) will be described in detail below. Unless otherwise specified, materials, shapes, etc. are similar to those according to the second exemplary embodiment. The similar components are given the same reference numerals, and detailed description thereof is omitted.

Figure 18:
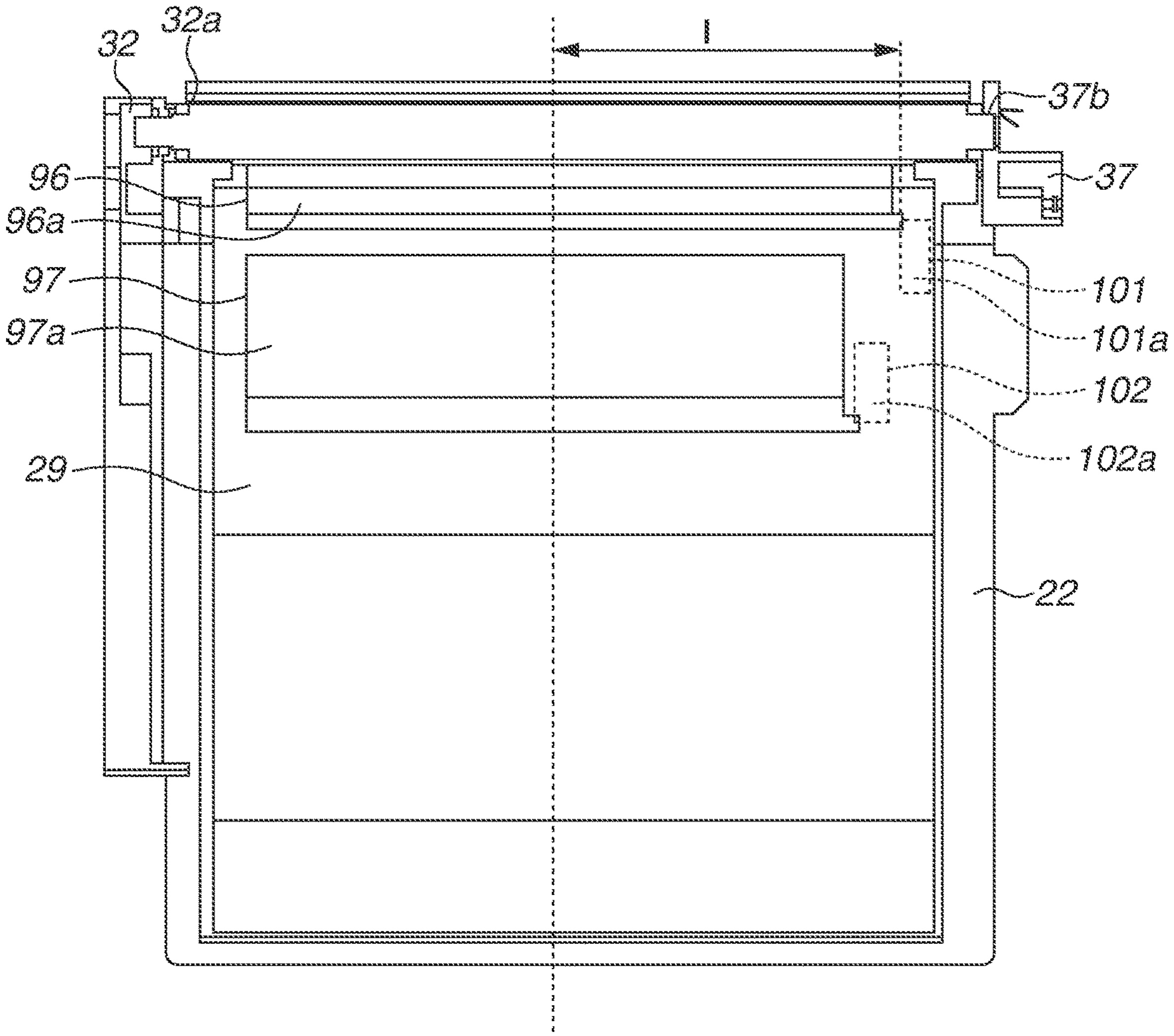
FIG. 18 is a cross sectional view illustrating a development unit of a process cartridge according to a third exemplary embodiment.
Figure 19:
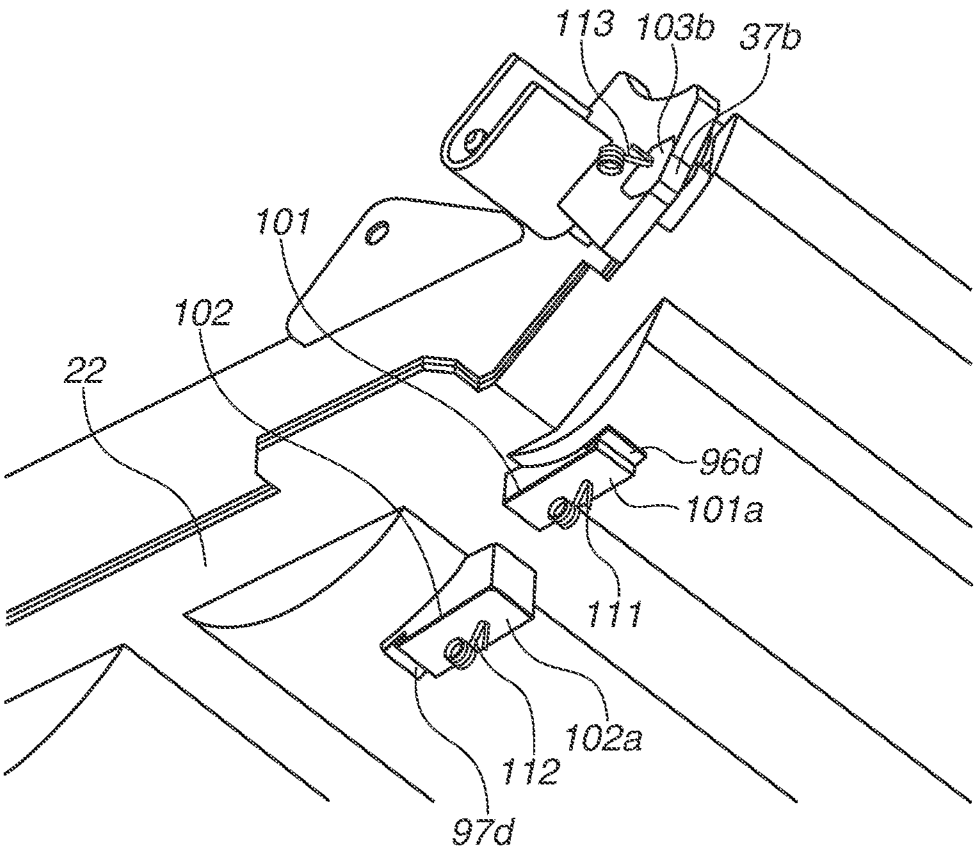
FIG. 19 is a perspective view illustrating the development unit of the process cartridge according to the third exemplary embodiment.

The detection of the amount of remaining developer according to the third exemplary embodiment will be described below with reference to FIGS. 18 and 19. FIG. 18 is a cross sectional view illustrating the development unit 20 to illustrate the remaining developer amount detection unit. FIG. 19 is a perspective view illustrating the remaining developer amount detection unit of the apparatus body A in addition to the cartridge B inserted in the apparatus body A when the development unit 20 is viewed from the direction N in FIG. 5B.

According to the third exemplary embodiment, as illustrated in FIG. 19, the bearing member conductive resin portion 37*b* is provided as a contact point. The bearing member conductive resin portion 37*b* has a development pressed surface 103*b* which is perpendicular to the shaft of the development roller 32. Further, the development pressing portion 113 of the apparatus body A is horizontal to the development contact point and projects toward the development contact point.

Further, as in the first exemplary embodiment, when the cartridge B is completely attached to the apparatus body A, the development pressing portion 113 presses the development pressed surface 103*b* due to the resilience of the twisted coil spring.

The above-described arrangement reduces the necessity to provide a system for pressing the development contact point plate 103 from below in the vertical direction on a lower portion of the development unit 20 and a corresponding position of the apparatus body A. This allows the first electrode contact point plate 101 and the second electrode contact point plate 102 to be disposed at farther positions on the non-driving side from the center as illustrated in FIG. 18 than those in the first exemplary embodiment. Specifically, the electrode sheet is extendable up to the edge in the developer storage container, and the distance from the lengthwise center C of the development roller to the non-driving-side end portion of the electrode sheet can be increased. This makes it possible to extend the width of the first electrode plate 96 in the lengthwise direction to further improve the remaining amount detection accuracy. Further, since the bearing member conductive resin portion 37*b* is provided on the bearing member 37, it is less necessary to add another member to the side surface. This makes it possible to improve the remaining amount detection accuracy while preventing an increase in size of the apparatus body A and the cartridge B.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:

a main assembly including a main body contact, wherein the main body contact includes:

(i) a first main body contact point, (ii) a second main body contact point, and (iii) a third main body contact point;

a cartridge including, a housing configured to store developer, a conveyance member configured to convey the developer, a developer carrying member configured to carry the developer, and a cartridge contact including (i) a first contact point plate configured to be electrically connected to the first main body contact point, (ii) a second contact point plate configured to be electrically connected to the second main body contact point; and (iii) a third contact point plate configured to be electrically connected to the third main body contact point; and a cartridge support member to which the cartridge is removably attached, wherein the cartridge support member is movable, relative to the main assembly, from a first position where the cartridge is attached to the main assembly and the cartridge support member is inside of the main assembly to a second position where the cartridge is capable of being attached to and being removed from the cartridge support member, wherein, in a state where the cartridge support member is at the first position, the first main body contact point is directly below the first contact point plate and presses the first contact point plate, the second main body contact point is directly below the second contact point plate and presses the second contact point plate, and the third main body contact point is directly below the third contact point plate and presses the third contact point plate, wherein the first main body contact point, the second main body contact point, and the third main body contact point are disposed at different positions with respect to a rotation axis direction of the developer carrying member, and wherein the first main body contact point, the second main body contact point, and the third main body contact point are disposed at different positions with respect to a direction orthogonal to an insertion direction of the cartridge support member, and the insertion direction is a direction in which the cartridge support member is moved from the second position to the first position.

2. The image forming apparatus according to claim 1, wherein, as viewed in the rotation axis direction, the cartridge contact is closer to the developer carrying member than the conveyance member is.

3. The image forming apparatus according to claim 2, wherein, with respect to the insertion direction, the cartridge contact is on a downstream side of the conveyance member.

4. The image forming apparatus according to claim 3, wherein, in the state where the cartridge support member is at the first position, the first contact point plate, the second contact point plate, and the third contact point plate face downward.

5. The image forming apparatus according to claim 4, wherein the conveyance member is configured to rotate, and includes a shaft and a sheet attached to the shaft.

6. The image forming apparatus according to claim 5, wherein the conveyance member included with the cartridge is a first conveyance member and the cartridge further includes a second conveyance member configured to convey the developer, and wherein, as viewed in the rotation axis direction, the second conveyance member is closer to the developer carrying member than the first conveyance member is.

7. The image forming apparatus according to claim 6, wherein, with respect to the insertion direction, the cartridge includes a downstream end and an upstream end opposite to the downstream end, and the cartridge contact and the developer bearing member are closer to the downstream end than to the upstream end.

8. The image forming apparatus according to claim 7, wherein, in the state where the cartridge support member is at the first position, a length of the cartridge in a horizontal direction is longer than a length of the cartridge in a vertical direction as viewed in the rotation axis direction.

9. The image forming apparatus according to claim 1, wherein, with respect to the insertion direction, the cartridge contact is on a downstream side of the conveyance member.

10. The image forming apparatus according to claim 1, wherein, in the state where the cartridge support member is at the first position, the first contact point plate, the second contact point plate, and the third contact point plate face downward.

11. The image forming apparatus according to claim 1, wherein the conveyance member is configured to rotate, and includes a shaft and a sheet attached to the shaft.

12. The image forming apparatus according to claim 1, wherein the conveyance member included with the cartridge is a first conveyance member and the cartridge further includes a second conveyance member configured to convey the developer, and wherein, as viewed in the rotation axis direction, the second conveyance member is closer to the developer carrying member than the first conveyance member is.

13. The image forming apparatus according to claim 1, wherein, with respect to the insertion direction, the cartridge includes a downstream end and an upstream end opposite to the downstream end, and the cartridge contact and the developer bearing member are closer to the downstream end than to the upstream end.

14. The image forming apparatus according to claim 1, wherein, in the state where the cartridge support member is at the first position, a length of the cartridge in a horizontal direction is longer than a length of the cartridge in a vertical direction as viewed in the rotation axis direction.

* * * * *